(12) United States Patent (10) Patent No.: US 7,782,245 B2
Pearson et al. (45) Date of Patent: Aug. 24, 2010

(54) RADAR SYSTEM

(75) Inventors: Graham Pearson, Essex (GB); Steve Greendale, Cambridge (GB); David Spreadbury, Cambridge (GB)

(73) Assignee: Plextek Limited, Essex (GB)

( * ) Notice: Subject to any disclaimer, the term of this patent is extended or adjusted under 35 U.S.C. 154(b) by 0 days.

(21) Appl. No.: 12/503,377

(22) Filed: Jul. 15, 2009

(65) Prior Publication Data

US 2009/0273505 A1 Nov. 5, 2009

Related U.S. Application Data

(63) Continuation of application No. 12/123,151, filed on May 19, 2008, now Pat. No. 7,567,202, which is a continuation of application No. PCT/EP2006/068730, filed on Nov. 21, 2006.

(30) Foreign Application Priority Data

Nov. 21, 2005 (GB) ................................. 0523676.5
Jan. 13, 2006 (GB) ................................. 0600704.1

(51) Int. Cl.
*G01S 13/62* (2006.01)

(52) U.S. Cl. ........................... 342/81; 342/28; 342/100; 342/103; 342/114; 342/130; 342/157; 342/158; 342/160; 342/189; 342/192; 342/196; 342/111; 342/116

(58) Field of Classification Search ................... 342/28, 342/70–72, 81–103, 107–117, 128–139, 342/145, 157–158, 160, 162, 189, 192, 196
See application file for complete search history.

(56) References Cited

U.S. PATENT DOCUMENTS 3,290,688 A 12/1966 Kraus
4,348,680 A 9/1982 Collier
4,743,910 A * 5/1988 Hill et al. .................... 342/159

(Continued)

FOREIGN PATENT DOCUMENTS

GB 1071854 6/1967

(Continued)

OTHER PUBLICATIONS

Tekin, Ibrahim et al., "Simultaneous Frequency and Direction Finding Technique Using Frequency Scanning Antenna," Proceedings of the European Microwave Conference, Espoo, Finland, Aug. 24-27, 1992, Tunbridge Wells, MEP, GB, vol. 1, Conf. 22, Aug. 24, 1992, pp. 654-658, XP000337824, abstract; figure 1.

(Continued)

*Primary Examiner*—John B Sotomayor
(74) *Attorney, Agent, or Firm*—BainwoodHuang

(57) ABSTRACT

A scanning radar system suitable for detecting and monitoring ground-based targets includes a frequency generator, a frequency scanning antenna, and a receiver arranged to process signals received from a target so as to identify a Doppler frequency associated with the target. The frequency generator generates sets of signals, each set having a different characteristic frequency, and includes a digital synthesiser arranged to modulate a continuous wave signal of a given characteristic frequency by a sequence of modulation patterns to generate one set of signals. The frequency scanning antenna cooperates with the frequency generator to transceive radiation over a region having an angular extent dependent on the generated frequencies. Digital synthesiser techniques capable of precise frequency generation and control are combined with passive frequency scanning and Doppler processing techniques, enabling accurate control of range and scan rates, and optimisation of range cell size for factors such as slow and fast target detection and Signal to Noise ratio, so that targets can be detected at distances considerably farther away than is possible with known systems having similar power requirements.

18 Claims, 16 Drawing Sheets

U.S. PATENT DOCUMENTS

| | | | |
|---|---|---|---|
| 4,912,474 A | | 3/1990 | Paturel et al. |
| 5,351,053 A | | 9/1994 | Wicks et al. |
| 5,361,072 A | * | 11/1994 | Barrick et al. ............. 342/133 |
| 5,497,157 A | | 3/1996 | Gruener et al. |
| 5,657,022 A | * | 8/1997 | Van Etten et al. .......... 342/104 |
| 5,963,163 A | * | 10/1999 | Kemkemian et al. ........ 342/109 |
| 6,061,035 A | | 5/2000 | Kinasewitz et al. |
| 6,225,943 B1 | * | 5/2001 | Curley et al. ................ 342/137 |
| 7,081,848 B1 | * | 7/2006 | Adams ....................... 342/118 |
| 7,109,916 B2 | * | 9/2006 | Klinnert et al. ............. 342/134 |
| 2008/0284641 A1 | * | 11/2008 | Spreadbury ................. 342/201 |
| 2008/0284651 A1 | * | 11/2008 | Pearson et al. .............. 342/372 |
| 2008/0284652 A1 | * | 11/2008 | Pearson ...................... 342/372 |

FOREIGN PATENT DOCUMENTS

| | | |
|---|---|---|
| GB | 1105758 | 3/1968 |
| WO | 2004046752 A | 6/2004 |
| WO | 2007057475 A2 | 5/2007 |

OTHER PUBLICATIONS

Chan, Kin-Lung et al., "A Beam Scanning Frequency Modulated Continuous Wave Radar," IEEE Transactions on Instrumentation and Measurement, IEEE Service Center, Piscataway, NJ, US, vol. 47, No. 5, Oct. 1998, XP011024583, ISSN: 0018-9456, the whole document.

Tospann, F-J et al., "Multifunction 35 GHZ FMCW Radar With Frequency Scanning Antenna Forsynthetic Vision Applications," Proceedings of the SPIE, SPIE, Bellingham, VA, US, vol. 2463, Apr. 17, 1995, pp. 28-37, XP000198257, ISSN: 0277-786X, the whole document.

\* cited by examiner

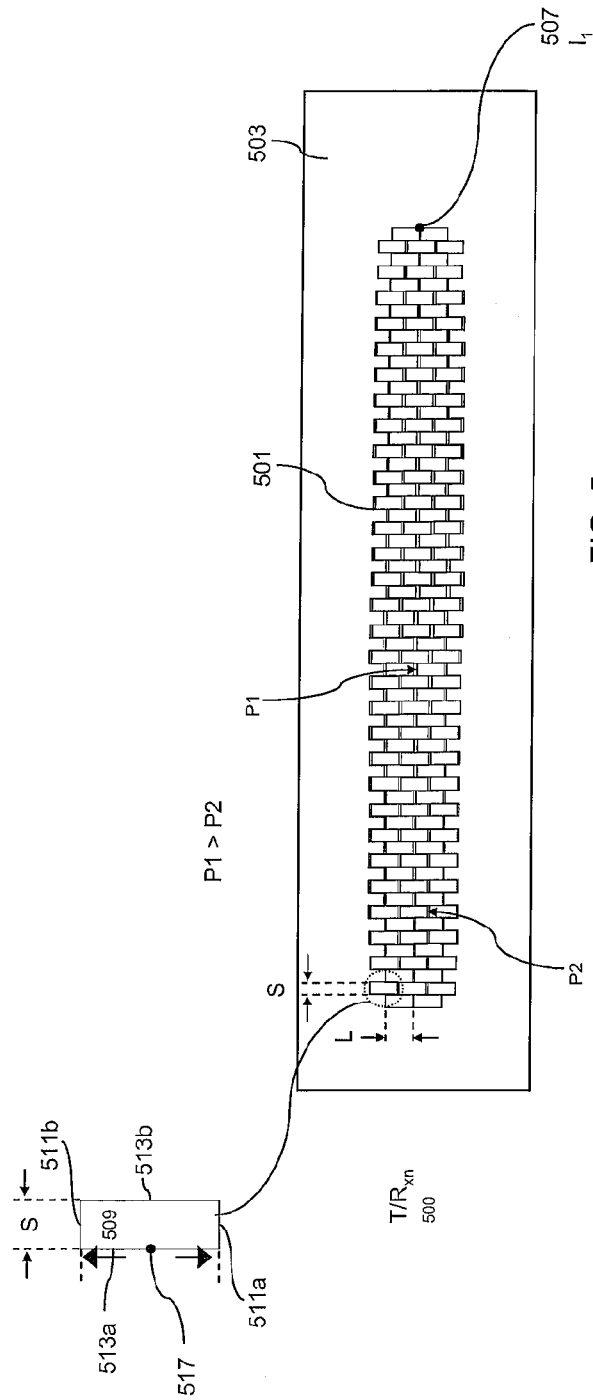
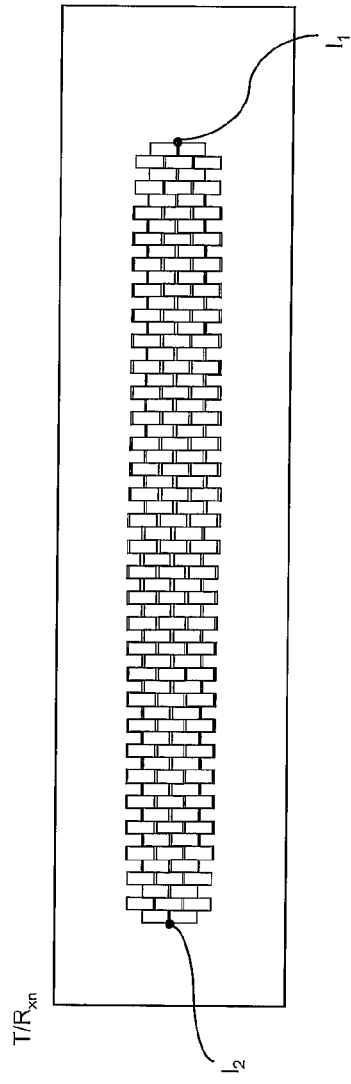
FIG. 5a
FIG. 5b

View on end A-A

RADAR SYSTEM

BACKGROUND OF THE INVENTION

The present invention relates to a radar system, and relates specifically to scanning radar systems that are particularly, but not exclusively, suitable for detecting and monitoring ground-based targets.

Radar systems are used to detect the presence of objects and to measure the location and movement of objects. In general, radar systems are designed for a specific application: to measure distance over a specified range of distances; over a specified scan region; within a specified level of accuracy; and in relation to a specified orientation. For radar systems that are required to scan over large distances, the antennas are required to generate powerful electromagnetic radiation, requiring the use of a correspondingly powerful source and specific types of antennas.

It is common for such radar systems to sweep across a given region, scanning the region for the presence of such objects. In order to sweep over the region the radar systems either employ mechanical devices comprising an antenna that physically moves in space, or electronic devices comprising elements that are arranged to steer radiation as it is transmitted or received. A problem with the mechanical radar systems is that their operation is reliant on physical components and associated control and moving parts. This inventory of parts is costly and can require a commensurately large power source.

One known group of electronic devices is phased antenna arrays, which apply various phase shifts to signals, thereby effectively steering the received and transmitted beams. These electronic devices are commonly used in RF sensor and communications systems because they do not involve physical motion of the antenna and are capable of moving a beam rapidly from one position to the next. Whilst radar systems incorporating such devices can provide an extremely accurate measure of the position of targets, a problem with these types of electronic devices is that adequate control of the beam requires often several arrays of electronics components; this increases the physical size, complexity and cost of the radar system.

Another group of such electronic devices is frequency scanning arrays, which, in response to input signals of varying frequencies, can steer a beam in an angular plane. Frequency scanning arrays have been combined with moving parts that rotate in another plane, as described in U.S. Pat. No. 4,868,574. However, a problem with this combination is that it incurs the size and cost shortcomings of regular mechanical scanning system and performance-wise, is less accurate than the phased antenna systems.

It will therefore be appreciated that the various known radar systems are one or several of costly, bulky and heavy, which limits their applicability to uses in which either cost or weight or size are an issue.

SUMMARY OF THE INVENTION

In accordance with a first aspect of the present invention, there is provided a scanning radar system comprising a frequency generator, a frequency scanning antenna, and a receiver arranged to process signals received from a target so as to identify a Doppler frequency associated with the target. The frequency generator is arranged to generate a plurality of sets of signals, each set having a different characteristic frequency. The frequency generator includes a digital synthesiser arranged to modulate a continuous wave signal of a given characteristic frequency by a sequence of modulation patterns whereby to generate the set of signals. The frequency scanning antenna is arranged to cooperate with the frequency generator so as to transceive radiation over a region having an angular extent dependent on the generated frequencies.

The inventors of the present invention have focussed the design effort on low power radar systems that are capable of detecting and locating objects moving along the ground, and to this end have combined digital synthesiser techniques, which are capable of precise frequency generation and control, with passive frequency scanning and Doppler processing techniques. This enables accurate control of range and of scan rates, and enables optimisation of range cell size for factors such as slow and fast target detection and Signal to Noise ratio, and thus enables detection of targets located at distances considerably farther away than is possible with known systems having similar power requirements.

With scanning radar systems there is inherently a trade off between the rate at which an area is scanned and the range, or distance, over which targets can be detected during the scan. For relatively fast scan rates, a given angular region can be scanned several times as a target moves relative to the region, but the number of signals in a given set of signals will be correspondingly limited, with the result that the detectable range will be limited. For relatively slow scan rates, the number of signals in a given set of signals is relatively high, meaning that targets located further away can be detected, at the expense of tracking movement of targets within the angular region. Advantageously these parameters can be accurately and repeatably controlled by the digital synthesiser, while use of a frequency scanning radar means that the radar system can return to transmit at precisely the same angle at which signals have previously been transmitted, thereby reducing errors in range return associated with Doppler modulation that are associated with mechanical scanning radar systems.

The range $R_{max}$ of the scanning radar system according to embodiments of the invention can be estimated from the radar equation $R_{max} = (P_t G A_e \sigma / ((4\pi)^2 S_{min}))^{1/4}$, where $S_{min}$ is the minimum detectable signal (as a power value), $P_t$ is the transmitted power, G is the gain of the antenna, $A_e$ is the effective aperture of the antenna and $\sigma$ is the cross sectional area of the target. For a target having a cross sectional area of approximately 1 m$^2$, the maximum range $R_{max}$ is approximately 5 km; for targets such as cars, which present a cross sectional area of approx 10 m$^2$, the maximum range $R_{max}$ is approximately 9 km while for larger targets having a cross sectional area of the order 100 m$^2$, the maximum range $R_{max}$ is approximately 15 km. It will be appreciated that as the scanning duration in a particular direction increases, the value of $S_{min}$ will decrease; accordingly, for a given target size, the radar range in respect of that target in the particular direction will increase until, due to system imperfections, target motion and Doppler spread, further scanning in that direction cannot reduce $S_{min}$ or increase Pt any further to have a material bearing on $R_{max}$.

Since signal strength is proportional to distance to the fourth power from source, an advantage of designing a short range radar system is that the power required to transmit radiation within a range of tens of km requires less power than conventional radars typically require. Consequently the weight and required output of the power source components is less than that required by conventional radar systems.

The radar system might be physically located on the ground or sited upon an object that is itself grounded (such as on a floor of a building or upon a vehicle).

A further advantage of embodiments of the invention is that frequency scanning antennas are less complex, in terms of processing and control components, than phased antenna arrays or mechanical steering antennas. As a result, the size and weight of the antenna circuit components are relatively small and light, respectively. These factors together enable the radar system to be powered by for example a 12 Volt battery, a solar panel or a vehicle battery (e.g. via a convenient connection within the vehicle such as a cigarette lighter) such as a 12, 24 or 48 Volt vehicle battery.

In one arrangement the radar system is arranged to transmit data indicative of radiation received and processed thereby to a remote processing system for display, review and interpretation at the remote processing system instead of at the radar system, thereby further reducing the processing and control components required by the radar system. Advantageously, and as will be appreciated from the foregoing, since a radar system according to this aspect of this invention is neither bulky nor heavy, it readily lends itself to portability.

Having selected a frequency scanning antenna, the inventors were faced with the problem of identifying a frequency source that minimises the amount of phase noise in the signal, so as to enable discrimination between small targets that move and large stationary targets. Most known synthesisers utilise a fixed frequency source (e.g. in the form of a crystal oscillator), which, in order to generate a range of frequencies, are integrated with a circuit that includes frequency dividers and a variable frequency oscillator (conventionally referred to as Phase Locked Loop Synthesisers). Such variable frequency oscillators inherently have a certain amount of phase noise (typically referred to as dither) in the output signals, and phase locked loop synthesisers multiply up the signal received from the signal generator, including the noise. As a result, a signal with a significant amount of dither, when reflected from a stationary target, can confuse the signal processing components and appear as a moving target.

Preferably, therefore, the frequency generator is embodied as a signal generator comprising a first circuit portion and a second circuit portion, wherein the first circuit portion includes a variable frequency oscillator arranged to output signals at an output frequency in dependence on control signals input thereto and tuning means arranged to generate the control signals on the basis of signals received from the second circuit portion for use in modifying operation of the variable frequency oscillator, and the second circuit portion is arranged to receive the output signals and to derive therefrom signals to be input to the tuning means, the second circuit portion comprising a frequency divider arranged to generate signals of a divided frequency, lower than the output frequency. The second circuit portion also includes means arranged to derive reduced frequency signals from the output signal, the reduced frequency signals being of a frequency which is lower than the output frequency and higher than the divided frequency.

Conveniently the frequency generator further includes a fixed frequency oscillator such as a crystal oscillator or SAW (Surface Acoustic Wave) oscillator, which provides input to the first circuit portion. In one arrangement the tuning means of the first circuit portion preferably comprises a further frequency divider and a phase comparator, and the second circuit portion comprises a static frequency multiplier and a mixer which cooperate so as to reduce the frequency of signals that are input to the frequency divider of the second circuit portion. The further frequency divider associated with the first circuit portion is employed to step-down the fixed oscillator frequency, so as to control the frequency resolution of the signal generator. In relation to the second circuit portion, the frequency divider is employed to step-down the frequency of signals output from the mixer, and the output from the first and second frequency dividers are synchronised by a phase comparator, which generates the control signals (in the form of phase-error signals) to modify the output of the voltage controlled oscillator. Conveniently the second circuit portion serves to reduce the frequency of signals that are input to the second frequency divider, which means that the amount of multiplication required by the second frequency divider is correspondingly reduced.

Since phase noise is dependent on the amount by which the frequency of a given signal is multiplied, substantially less phase noise is present in the signals generated by embodiments of the invention compared with that generated by conventional signal generators. In addition, this means that phase locked loops of signal generators embodied according to the invention are capable of operating at higher loop frequencies than is possible with conventional arrangements.

Essentially, therefore, the inventors identified a specific arrangement of components which minimises the amount by which output from the frequency source is multiplied, and thus the amount of phase noise that is transmitted.

In preferred arrangements, the scanning radar system is a Frequency Modulated Continuous Wave (FMCW) radar system, which is arranged to output a frequency modulated signal of a predetermined pattern, preferably comprising a sequence of linear frequency sweeps. In a most convenient arrangement the digital synthesiser is responsive to inputs so as to repeat the modulation pattern a predetermined number of times.

Radar systems are commonly used to identify the Doppler frequency of targets so as to identify the magnitude and direction of movement thereof. The inventors have identified a problem with FMCW radar resulting from the fact that a target's Doppler frequency is dependent on the radar's carrier frequency, namely that a radar which operates within a range of frequencies can generate Doppler frequencies for a given target which can, of themselves, indicate movement of the target. The inventors realised that by varying the period of the frequency sweeps in proportion to the carrier frequency, the normalised Doppler frequency remains substantially constant.

Accordingly in relation to this aspect of the present invention, the inventors have developed a frequency scanning radar controller for use in controlling frequency modulation of a continuous wave signal, the continuous wave signal having a characteristic frequency and being modulated by a sequence of modulation patterns, wherein the radar controller is arranged to modify a given modulation pattern in dependence on the characteristic frequency of the signal being modulated.

In preferred embodiments of the invention the radar controller is arranged to modify the duration of individual patterns in the sequence, thereby modifying the modulation pattern. In one arrangement each modulation pattern of the sequence comprises a linear ramp period and a dwell period, and the radar controller is arranged to modify the duration of dwell periods of respective modulation patterns in the sequence, thereby modifying the modulation pattern. In another arrangement each modulation pattern of the sequence comprises a linear ramp period and a descent period, and the radar controller is arranged to modify the duration of descent periods of respective modulation patterns in the sequence, thereby modifying the modulation pattern. In other arrangements the modulation pattern includes a combination of a ramp period, a descent period and a dwell period, in which case the duration of either of the descent or dwell periods can be modified.

Conveniently the frequency generator is responsive to inputs indicative of the respective durations so as to modulate the characteristic frequency.

In relation to the frequency scanning antenna, the inventors found that a particularly efficient antenna (in terms of level of complexity—relatively low—and performance—relatively good) is the travelling wave antenna. The inventors were then faced with the problem that a travelling wave antenna only radiates over a relatively narrow scan angle as the frequency is changed, this limiting the scan area over which the antenna could be used.

The inventors realised that two or more array antennas could be arranged to form an antenna structure, and that, by coordinating the feed to a respective antenna array of the antenna structure, individual scan areas can be combined to generate an increased overall scan region.

Accordingly the inventors developed a frequency scanning antenna structure for transceiving radio frequency energy and being capable of steering a radio frequency beam to a plurality of different angles about the antenna structure, the antenna structure comprising at least two array antennas and a controller for controlling input of energy to the two array antennas, wherein the array antennas are disposed within the antenna structure such that the antenna structure is capable of steering a beam to a first angle using one of the two array antennas and of steering a beam to a second angle, different to the first angle, using the other of the two array antennas.

In one arrangement the antenna structure is arranged to steer a beam across a plurality of non-contiguous angular regions, and in another to steer a beam across a contiguous angular region. Conveniently the antenna structure is capable of steering a beam across a first range of angles (a first angular region) using one of the two array antennas and of steering a beam across a second range of angles (second angular region) using the other of the two array antennas: the first and second angular regions being different, and collectively offering a scan region of an angular extent greater than that achievable with individual antenna arrays.

Conveniently each array antenna comprises input means for inputting the energy thereto, and the controller is arranged to input energy to respective array antennas so as to steer the beam to the first and second angles. More specifically, each input means is arranged to input energy to respective array antennas so as to steer the beam across the contiguous or non-contiguous angular regions. In one arrangement the input means is connectable to ends of the antenna array and is in operative association with a frequency generator—such as that described above—so as to receive signals comprising radio frequency energy at a plurality of different frequencies in order to steer the beam.

Preferably the controller is arranged to input energy in accordance with a predetermined sequence so as to steer the beam across the first and second angles, the sequence comprising, for example, inputting energy to a first end of the first antenna array, inputting energy to a first end of the second antenna array, inputting energy to a second end of the second antenna array, and inputting energy to a second end of the second antenna array.

In relation to the configuration of the antenna structure itself, the antenna structure can conveniently be characterised in terms of a longitudinal axis and a transverse axis perpendicular to the longitudinal axis: a first of the array antennas being inclined at the first angle relative to the transverse axis and a second of the array antennas being inclined at the second angle relative to the transverse axis. Moreover, the first and second array antennas are symmetrically disposed about the longitudinal axis and each of the array antennas comprises two ends and two side portions, a side portion of the second array antenna substantially abutting a side portion of the first array antenna. The extent of the scan region is dependent on the physical relationship between the two array antennas, more specifically on the angle each respective array antenna makes to the transverse axis. In one arrangement the angular extent of the radar system is substantially 80 degrees, but other angles are possible, ranging from 60 degrees, 100 degrees, 120 degrees, consistent with various arrangements of the antenna arrays within the antenna structure. Furthermore the antenna structure can be configured so as to include more than two array antennas, thereby further increasing the angular extent of the radar system.

In one arrangement, each of the array antennas comprises a mesh structure and a dielectric base. Each mesh structure can comprise a plurality of interconnected elements embodied as a micro circuit strip (commonly called a microstrip) and can conveniently be disposed on a surface of a corresponding dielectric base.

The mesh structure can conveniently be characterised by the lengths of respective sides and ends of the elements: each of the elements comprising two sides and two ends of respective lengths, the length of the sides being greater than the length of the ends. Typically the length of the sides is of the order of one wavelength at a mid-point between the first frequency and the second frequency and the length of the ends is of the order of one-half of one wavelength at the mid-point frequency. Each mesh element has a characteristic width, and in a preferred arrangement the mesh widths of the sides are progressively decreased from the centre of the mesh to each respective end thereof. Since impedance is inversely proportional to mesh width, it will be appreciated that this provides a convenient means of controlling the impedance of the antenna array elements and thus the resulting radiation pattern.

Further features and advantages of the invention will become apparent from the following description of preferred embodiments of the invention, given by way of example only, which is made with reference to the accompanying drawings.

BRIEF DESCRIPTION OF THE DRAWINGS

FIG. 5a is a schematic diagram showing an embodiment of an antenna array utilised in the antenna shown in FIG. 1;

FIG. 5b is a schematic diagram showing another embodiment of an antenna array utilised in the antenna shown in FIGS. 1 and 4;

Figure 1:
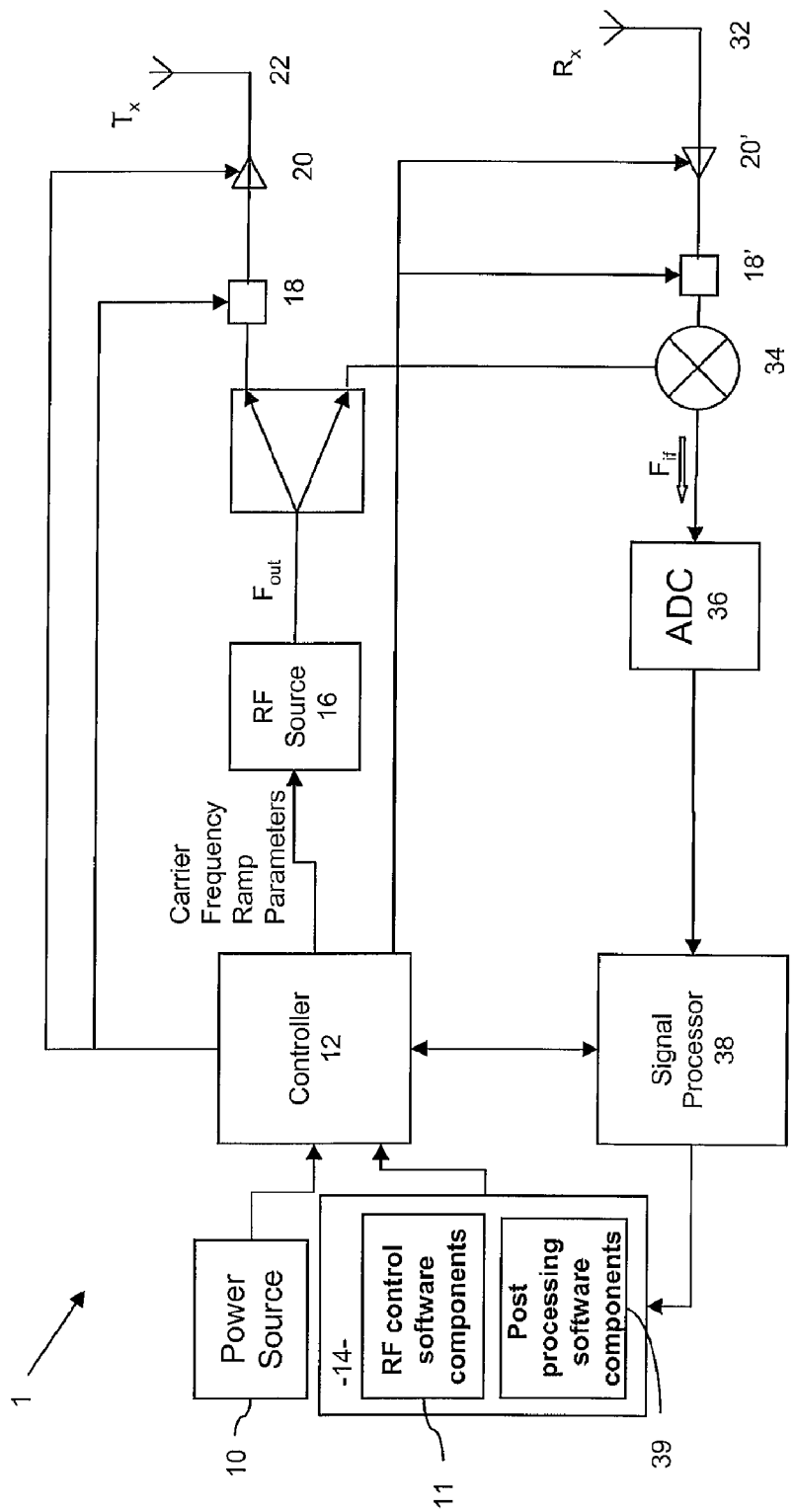
FIG. 1 is a schematic block diagram showing components of a radar system according to embodiments of the invention.

Several parts and components of the invention appear in more than one Figure; for the sake of clarity the same reference numeral will be used to refer to the same part and component in all of the Figures. In addition, certain parts are referenced by means of a number and one or more suffixes, indicating that the part comprises a sequence of elements (each suffix indicating an individual element in the sequence). For clarity, when there is a reference to the sequence per se the suffix is omitted, but when there is a reference to individual elements within the sequence the suffix is included.

DETAILED DESCRIPTION OF THE INVENTION

FIG. 1 shows a radar system 1 according to embodiments of the invention, comprising a power source 10, a controller 12, and a computer 14, the power source and computer 10, 14 being arranged to provide power to, and operational control over, the controller 12. The controller 12 comprises a microprocessor and a set of instructions (not shown) for execution thereby, effectively generating control signals that cause the RF frequency source, or signal generator 16, to output RF energy at a specified frequency $F_{OUT}$, and this output signal, under control of switches 18 and amplifiers 20, drives antenna 22 (whilst the Figure shows a switch component 18, it will be appreciated that in this particular arrangement—in which there is only one antenna 22—the switch 18 is inessential). As will be described in more detail below, the RF frequency source 16 generates signals within a range of frequencies, causing the antenna 22 to transmit beams in different angular directions, thereby scanning over a region beyond the radar system 1.

The radar system 1 also includes a receiving antenna 32, which receives radiated signals reflected back from objects, and passes the received radiation through switch and amplifier components 18', 20' to mixer 34. The mixer 34 comprises two inputs: a first connected to the RF source 16; and a second connected to the receiving antenna 32. The output of the mixer 34 is fed to an Analogue to Digital converter ADC 36, to produce a digitised signal for input to the signal processor 38, which performs analysis of the received signal. The signal processor 38 performs a spectral analysis on the received signals, because the range between the radar system and external (reflecting) objects is contained as frequency information in the signal. Aspects of the receiving and processing components are described in detail below, but first aspects of the RF frequency source and antenna will be described.

Figure 2:
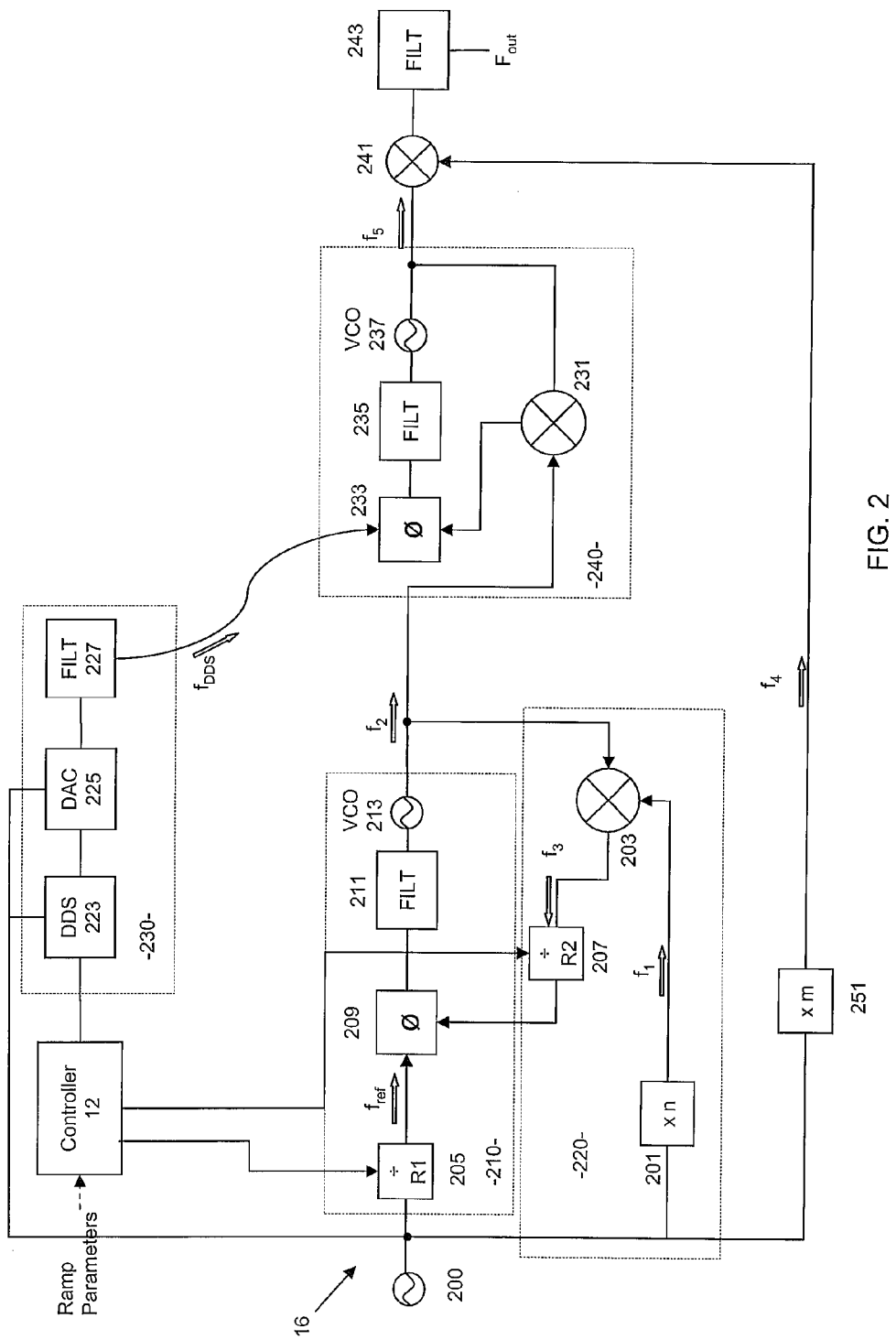
FIG. 2 is a schematic block diagram showing an arrangement of components of a frequency generator shown in FIG. 1.

FIG. 2 shows components of the RF frequency generator 16 according to an embodiment of the invention, which is preferably used to generate signals having a range of frequencies. Referring to FIG. 2, the frequency generator 16 comprises a frequency source 200, first circuit portion 210 and a second circuit portion 220. The first circuit portion 210 comprises a frequency divider 205, a phase comparator 209, a filter 211, and a Voltage Controlled Oscillator VCO 213, while the second circuit portion 220 comprises a frequency divider 207, static multiplier 201 and a mixer 203. The mixer 203 receives, as input, signals output from the VCO 213 and signals from the high grade, static multiplier 201, and generates signals of frequency equal to the difference between the frequencies of the two inputs ($f_3$). The values R1, R2 characterising the frequency dividers 205, 207 are selectable, and the phase comparator 209 is arranged to compare the frequency and phase of signals output from the frequency dividers 205, 207 ($f_3$/R2 and $f_{ref}$), so as to output a phase-error signal, of magnitude dependent on the difference between $f_3$/R2 and $f_{ref}$. The phase-error signal is input to the VCO 213, and the first circuit portion 210 operates so as to cause the output from the VCO 213 to stabilise in dependence on the phase-error signal. Thus different values of R2 can be used to force the loop to stabilise at a frequency multiple of the input signal. In one arrangement the frequency source 200 is embodied as a crystal oscillator and in another arrangement as a SAW oscillator.

As stated above, an objective of the design of the RF frequency generator 16 is to minimise the amount of phase noise present in the output signal $F_{OUT}$. As will be appreciated from earlier parts of this specification, multiplication of the phase noise of the reference oscillator and phase comparator is dependent on the magnitude of R1 and R2, so an objective of the RF frequency generator 16 is to minimise the amount of multiplication of the oscillator output 200—in other words to keep the values of R1 and R2 as low as possible.

Accordingly the frequency generator 16 includes high-quality multiplier 201 and mixer 203, the former (201) being arranged to increase the frequency of the signal output from oscillator 200 to as high a value as possible (e.g. the lower limit of the desired output frequency of VCO 213), while the mixer 203 serves to output signals of frequency equal to the difference between $f_2$ and $f_1$, thereby effectively stepping down the output of the VCO 213. As a result, the magnitude of the frequency input to divider 207 is relatively low, which means that for tuning of the output of VCO 213, the value of R2 can be far lower than that possible with conventional arrangements.

The advantages of embodiments of the invention can best be seen with reference to a particular example, considering firstly how signals are processed by conventional phase-locked loop circuits and then how signals are processed by embodiments of the invention, assuming frequency source 200 outputs signals with a frequency of 100 MHz:

|  | VCO 213 Output | R1 | R2 |
| --- | --- | --- | --- |
| Conventional | 5 GHz | 1 | 50 |
|  | 5.1 GHz | 1 | 51 |
|  | 5.11 GHz | 10 | 511 |
| Embodiments of the Invention n = 40 | 5 GHz | 1 | 10 |
|  | 5.1 GHz | 1 | 11 |
|  | 5.11 GHz | 10 | 111 |
| Embodiments of the Invention n = 50 | 5.1 GHz | 1 | 1 |
|  | 5.11 GHz | 10 | 10 |

It can be seen that by stepping up the frequency of signals input from the frequency source 200 and mixing them with the output of the VCO 213, the amount of multiplication applied by the frequency dividers 205, 207, and thus amplification of phase noise in the oscillator output, is correspondingly reduced compared to conventional frequency synthesisers. It is to be noted that the circuit design shown in FIG. 2 offers a 20-30 dB reduction in noise contribution of the phase detector compared to conventional circuits operating loop frequencies of the order 200 MHz.

Figure 3:
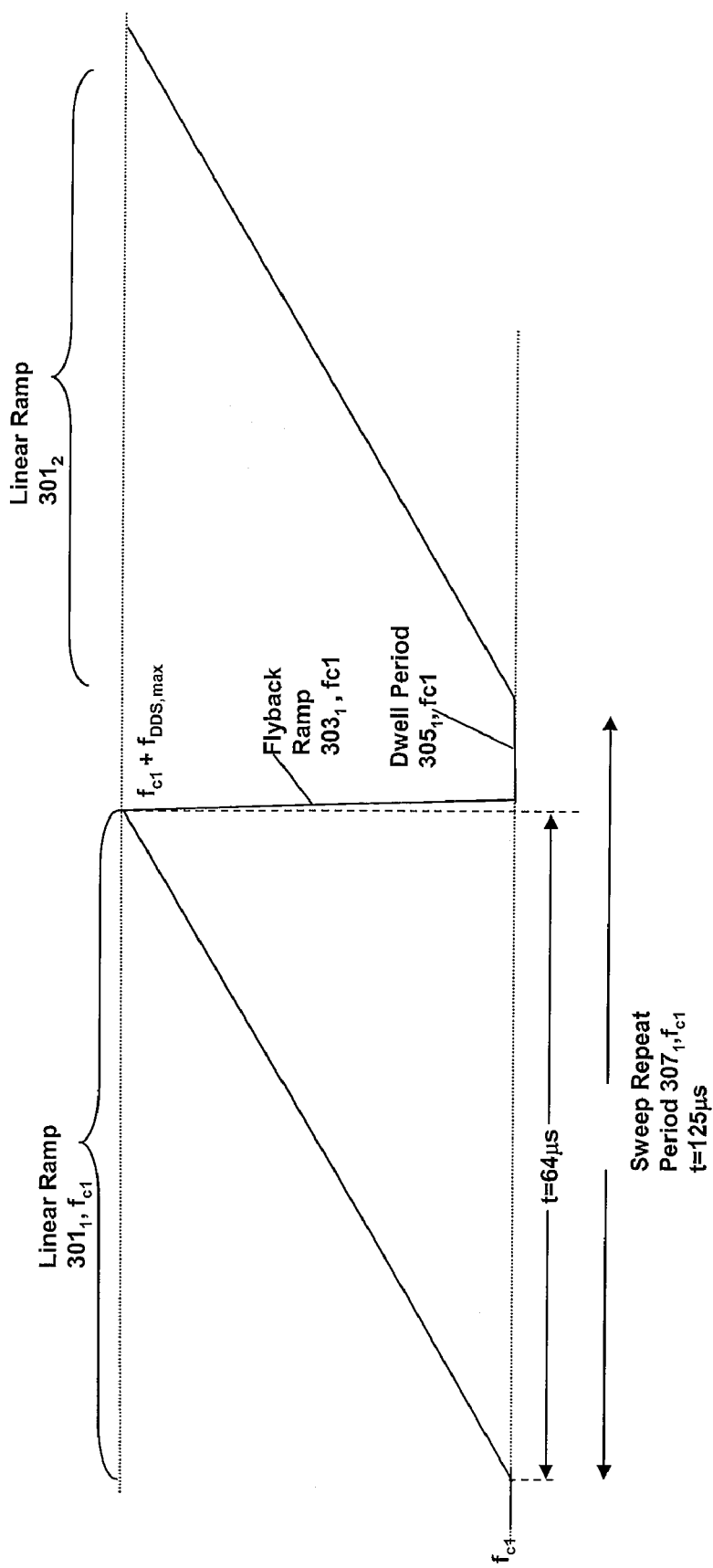
FIG. 3 is a schematic diagram showing a modulation pattern for use by the frequency generator of FIG. 2.

The signals output from the second circuit portion are then modulated by output $f_{DDS}$ of a third circuit portion 230, which in one arrangement comprises a Direct Digital Synthesiser 223, a Digital to Analogue Converter DAC 225 and a low pass filter 227. The third circuit portion 230 is configured, under control of the controller 12 shown in FIG. 1, to generate a repeating pattern comprising a linear frequency ramp. The ramp has a specified duration and magnitude, values of which are programmed via the controller 12. FIG. 3 shows an example of one such frequency ramp $301_1$ for a given carrier frequency $f_{c1}$, the duration of which is approximately 64 μs, the magnitude of which, in terms of range of frequencies $(f_{DDS,max} - f_{DDS,min})$, is approximately 20 MHz, and is followed by a flyback ramp 303, to prepare the third circuit portion 230 for the next ramp $301_2$. The pattern repeats at a predetermined rate—in the present example a rate of 8 KHz (thus a sweep repeat period 307 of 125 μs (subject to the modifications described later in the specification)) is a convenient choice. Such a modulation pattern is entirely conventional and the foregoing details are included as illustrative; the skilled person will appreciate that any suitable values could be selected, dependent upon the use of the radar system (e.g. the nature of the targets to be detected). For each carrier frequency, the third circuit portion 230 is arranged to repeat the linear ramp pattern a specified number of times, e.g. 256 or 512 times, the number being dependent on the desired signal to noise ratio and therefore a design choice. Whilst the third circuit portion 230 shown in FIG. 2 comprises digital synthesiser components, it could alternatively be embodied using analogue components such as a sawtooth generator and VCO or similar. Preferably, and in order to save power, it is to be noted that the antenna 22 is not energised during either of the flyback ramp or dwell periods 303, 305.

Turning back to FIG. 2, the output $f_{DDS}$ of the third circuit portion 230 is input to a fourth circuit portion 240, which comprises a phase comparator 233, a filter 235, a Voltage Controlled Oscillator 237 and a mixer 231. The mixer receives signals output from the second circuit (having frequency $f_2$) and signals output from the VCO 237 (having frequency $f_5$) and outputs a signal at a frequency equal to the difference in frequency between $f_2$ and $f_5$. The phase comparator 233 outputs a phase-error signal, of magnitude dependent on the difference between $(f_2-f_5)$ and $f_{DDS}$ to the VCO 237, and the fourth circuit portion 240 operates so as to cause the output from the VCO 237 to stabilise accordingly.

The signals output from the fourth circuit portion 240 (having frequency $f_5$) are then combined, by means of mixer 241, with signals of a reference frequency $f_4$, which are signals output from the oscillator 200 having been multiplied by a second static multiplier 251, and the output is filtered (filter 243) so as to generate a signal having an output frequency $F_{OUT}$. It will be appreciated from FIG. 2 that when the signal generator 16 is operable to output signals corresponding to a carrier frequency of between 15.5 GHz and 17.5 GHz, for a crystal oscillator 200 outputting signals of frequency 100 MHz, the second static multiplier 251 is of the order 130.

Whilst the signal generator 16 could be used to generate frequencies within any selected range of frequencies, when used as a ground-based radar system, the frequency range can fall within the X band (8 GHz-12.4 GHz); the Ku band (12.4 GHz-18 GHz); the K band (18 GHz-26.5 GHz); or the Ka band (26.5 GHz-40 GHz), and most preferably within the Ku band, or a portion within one of the afore-mentioned bands. Thus for each carrier frequency the frequency generator 16 generates a repeating pattern of frequency modulated signals of various carrier frequencies.

Figure 4:
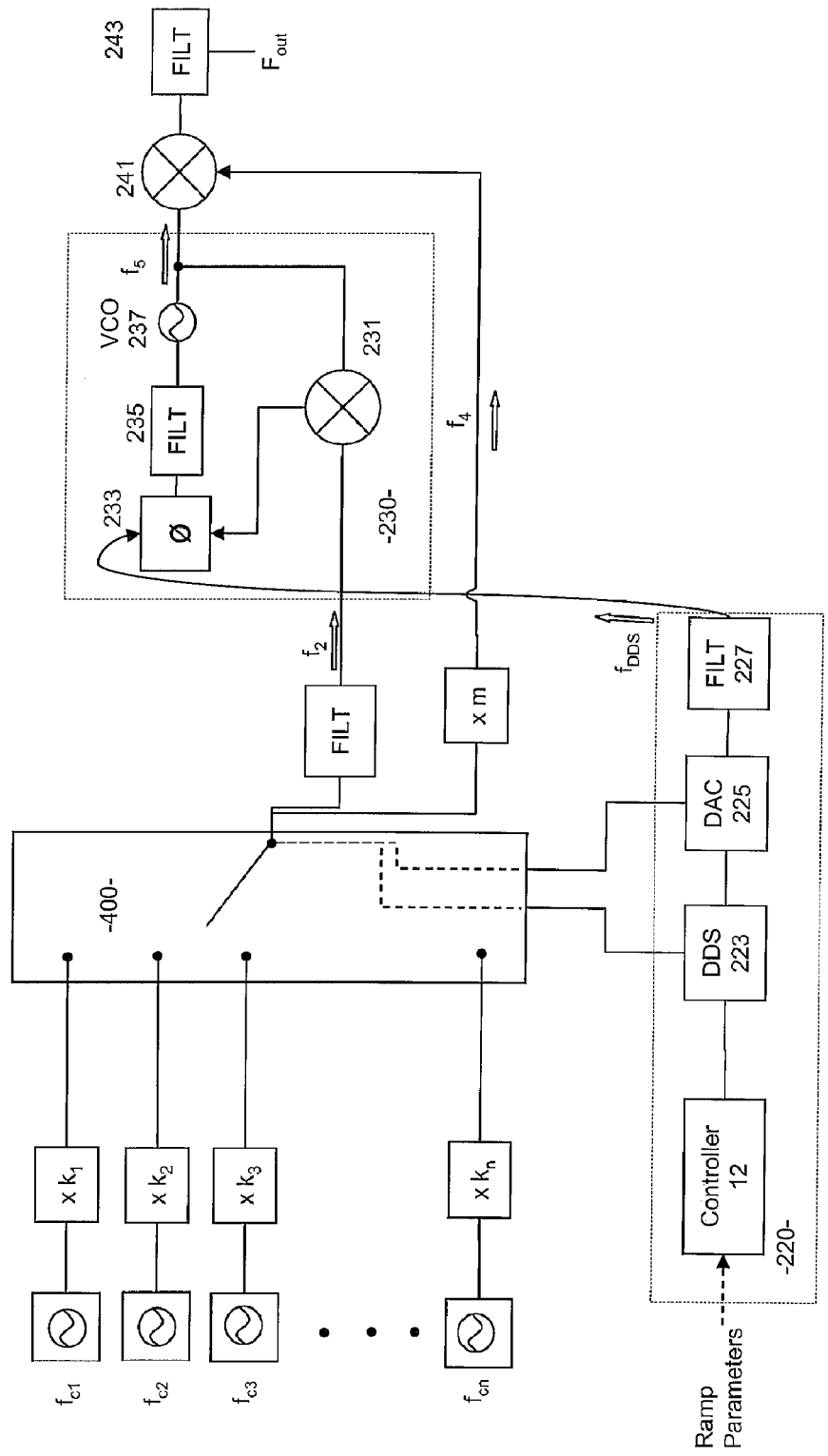
FIG. 4 is a schematic block diagram showing an alternative arrangement of components of a frequency generator shown in FIG. 1.

Whilst in preferred arrangements the first and second circuit portions 210, 220 of frequency generator 16 are embodied as shown in FIG. 2, the frequency generator 16 could alternatively be based on an arrangement comprising a plurality of fixed frequency oscillators, as shown in FIG. 4, one of which is selected via switch 400 so as to generate a signal at frequency $f_2$. Judicial selection of an appropriate fixed frequency oscillator (e.g. a crystal oscillator) means that the frequency generator 16 can incur minimal phase noise, since the signals are taken directly from one of the oscillators. However, this advantage is accompanied by a corresponding limitation, namely that there is no means for fine-tune adjustment of the carrier frequency, which can be a disadvantage when working with antennas 22 that require fine tuning of the carrier frequency to achieve optimal beamwidth distribution (in terms of distribution of radiation within the lobes).

It will be appreciated from the foregoing that the antennas 22, 32 transmit and receive radiation in response to input signals of varying frequencies; accordingly the antennas 22, 32 are of the frequency scanning antenna type. In a preferred embodiment, the frequency scanning antenna is embodied as a travelling wave antenna structure comprising at least two array antennas, one such antenna array 500 being shown in FIG. 5a. In one arrangement, the antenna array comprises a mesh structure 501 and a dielectric base 503 and has input means 507 for inputting energy to the mesh structure 501. Preferably the antenna array 500 also includes a ground plane. The input means 507 can comprise coaxial feeds positioned orthogonal to the plane of the antenna array 500, but the skilled person will appreciate that alternative feeds could be used.

In the arrangement shown in FIG. 5a, each mesh structure 501 comprises a plurality of rectangular interconnected elements 509 that are disposed on a surface of the dielectric base 503; each rectangular element 509 comprises two sides 513a, 513b and two ends 511a, 511b, the length L of the sides 513a, 513b being greater than the length S of the ends 511a, 511b. The physics underlying the operation of the travelling wave antenna are well known, having first been investigated by John Kraus and described in U.S. Pat. No. 3,290,688. Suffice to say that the length L of the sides 513 is of the order of one wavelength of the mean carrier frequencies, and the length S of the ends 511 is of the order one half of the wavelength of the mean carrier frequencies. It will be appreciated from the teaching in U.S. Pat. No. 3,290,688 that mesh configurations other than rectangular and planar can be used.

In relation to the particular configuration adopted for embodiments of the invention, when current is fed through the mesh structure 501 via feed 507, currents passing through the ends 511a, 511b are in phase with one another. The current flowing through a respective side 513a of a given element 509 is received from an end 511a of an adjacent element (shown as input 517) and splits into two current flows, each flowing in a different direction and being out of phase with one another. As is also shown in FIG. 5a, the width of the mesh making up sides 213a, 213b is progressively decreased from the centre of the mesh to each respective end thereof, thereby effectively increasing the length of the sides 213a, 213b from the centre of the array towards its ends. In a preferred arrangement the antenna can be embodied as a micro circuit strip.

Figure 6:
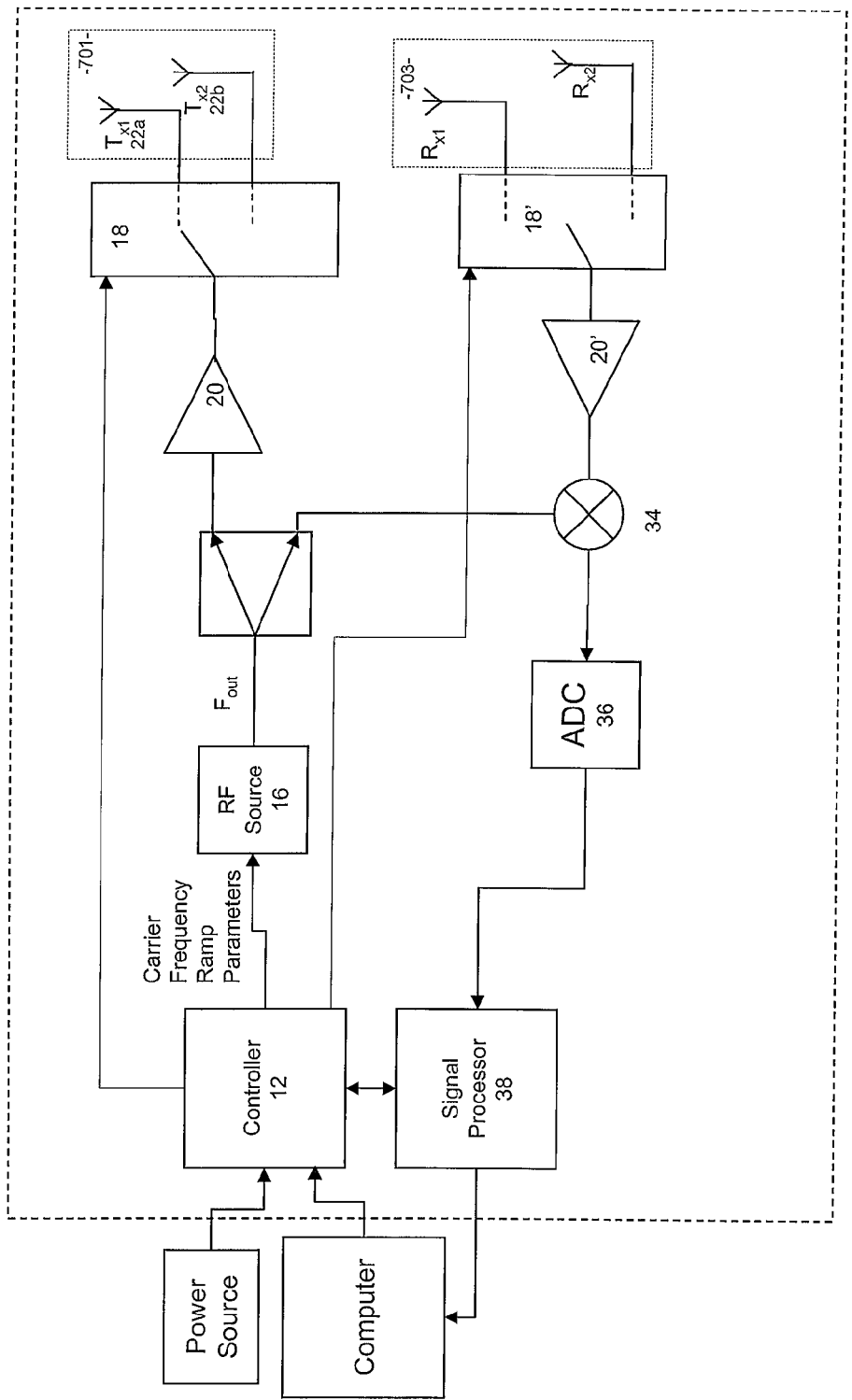
FIG. 6 is a schematic diagram showing components of a radar system according to an alternative embodiment of the invention.
Figure 7:
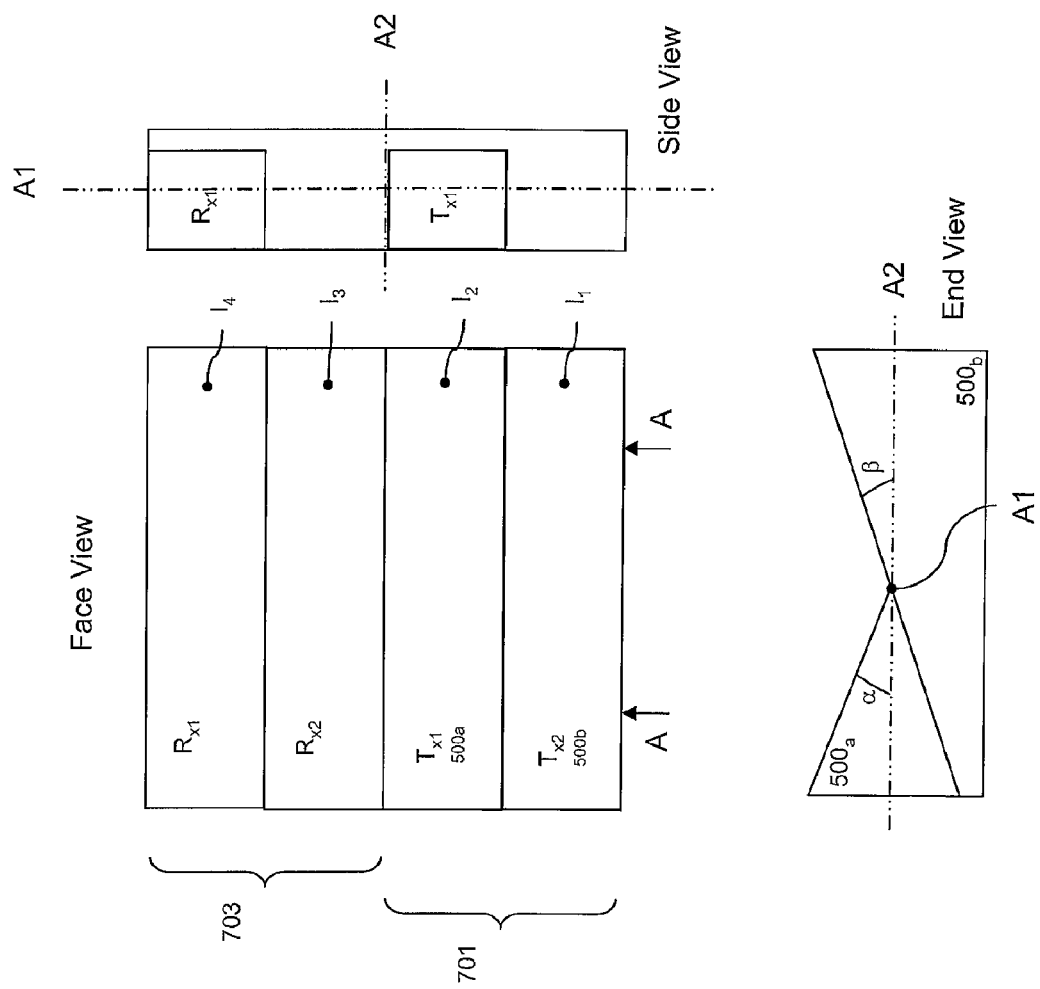
FIG. 7 is a schematic engineering drawing showing an antenna structure comprising the antenna arrays of FIG. 5a or 5b for use in either of the radar systems shown in FIG. 1 or 6.
Figure 8:
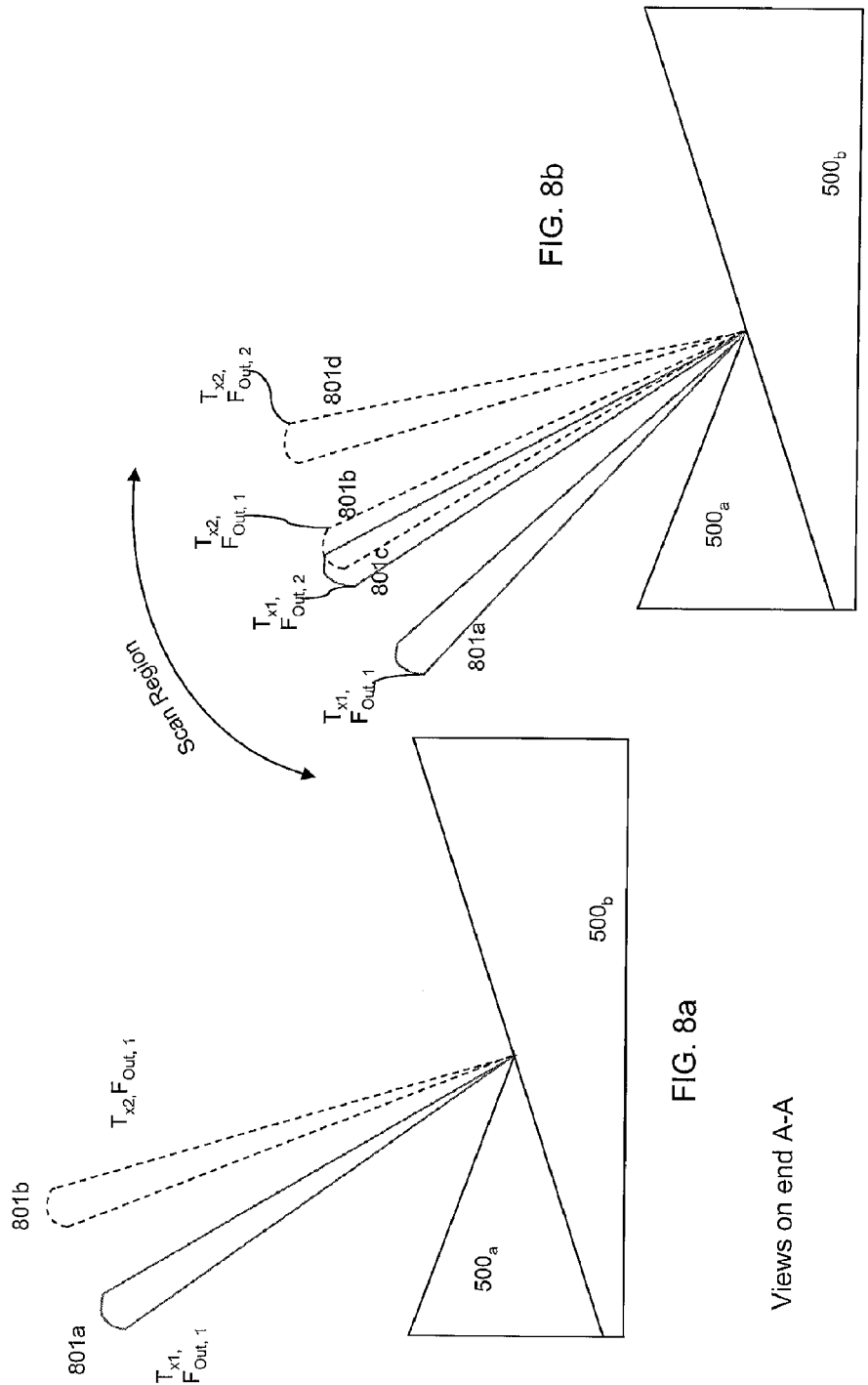
FIG. 8a is a schematic diagram showing radiation emitted from the antenna structure of FIG. 7 for a given output frequency.
FIG. 8b is a schematic block diagram showing radiation emitted from the antenna structure of FIG. 7 for two different output frequencies.

The configuration of the antenna structure 701 according to an embodiment of the invention will now be described with reference to FIGS. 6 and 7. FIG. 6 shows a development of the radar system 1 shown in FIG. 1, including two antennas 22a, 22b rather than one. Turning also to FIG. 7, each of the antennas 22a, 22b is embodied in the form of antenna array 500a, 500b shown in FIGS. 5a and 5b, and the antenna structure 701 is responsive to input from the controller 12 for controlling input of energy to respective feeds $I_1$, $I_2$ of the antenna arrays 500a, 500b. Referring also to FIG. 8a, the two planar array antennas 500a, 500b are disposed within the structure 701 such that, for any given radio frequency, the antenna structure 701 is capable of transmitting the radio frequency energy within different angular regions 801a, 801b.

Referring back to FIG. 7, the antenna structure 701 can be characterised by a longitudinal axis A1 and a transverse axis A2, which provides a convenient frame of reference for describing the arrangement of the planar antenna arrays 500a, 500b. As can be seen from FIG. 7, the first array antenna 500a is inclined at an angle α relative to the transverse axis A2 and the second planar array antenna 500b is inclined at angle β relative to the transverse axis A2. As can also be seen from the Figure, a side portion of the second array antenna 500b abuts a side portion of the first array antenna 500a (in the Figure the side portions are located on the dot indicating axis A1) such that when viewed face on, the antenna arrays 500b are located in adjacent longitudinal planes.

It will be appreciated from the schematic shown in FIG. 8a that the orientation of the respective antenna arrays 500a, 500b—that is to say angles α and β—determine the direction in which radiation is emitted from the antenna structure 701. Thus, by varying the relative positions of the respective antenna arrays 500a, 500b, different portions of an angular region can be scanned for a given output frequency, $f_{OUT,1}$.

FIG. 8b shows radiation emitted 801a-801d from the antenna arrays for two different output frequencies $f_{OUT,1}$, and $f_{OUT,2}$, and it can be seen that appropriate selection of the values of $f_{OUT,1}$ and $f_{OUT,2}$, results in the antenna structure 701 outputting radiation so as to cover a substantially contiguous region, thereby scanning over a greater angular region than is possible with a single antenna array, or even two arrays that are positioned in the same plane, such as that described in U.S. Pat. No. 4,376,938.

Figure 9:
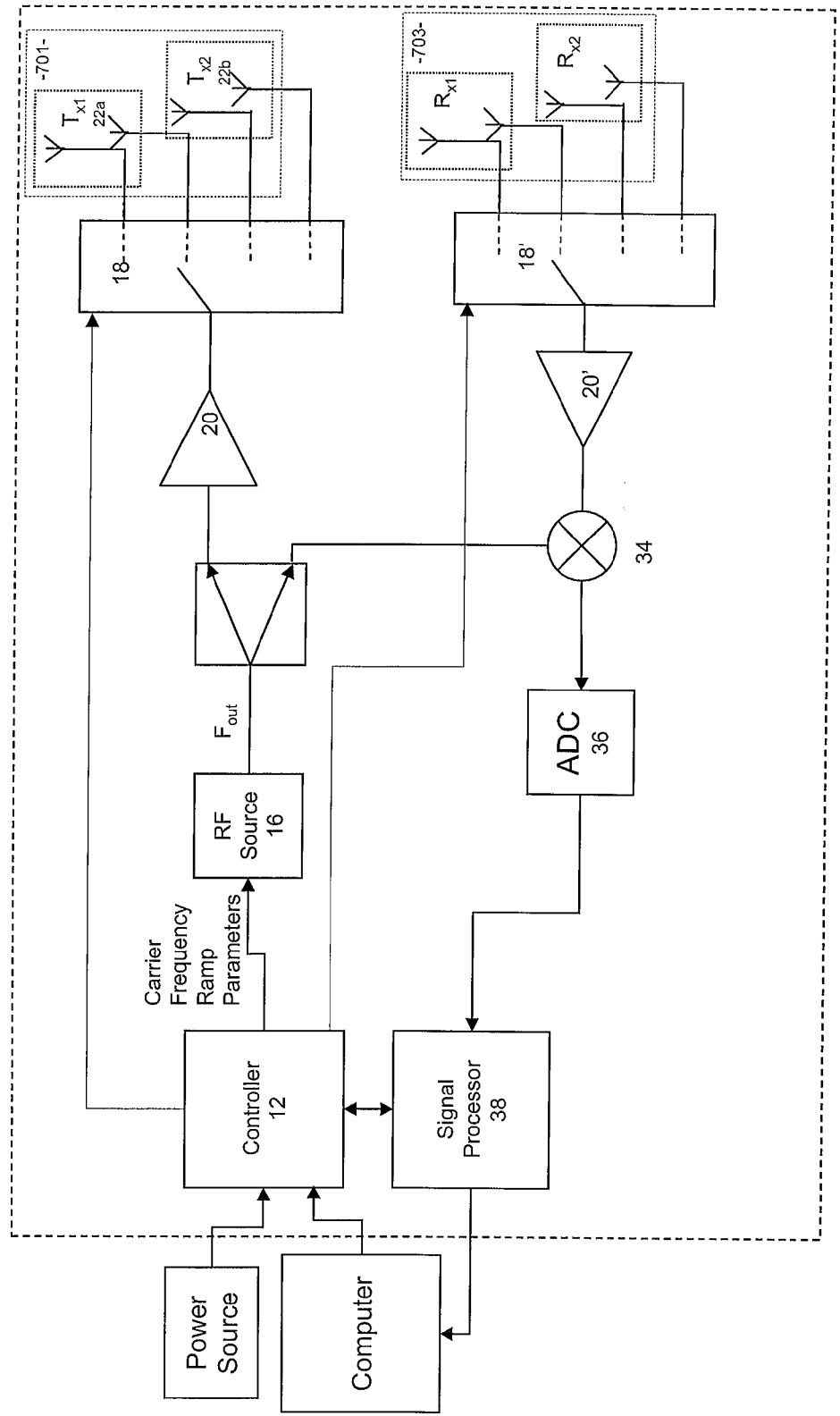
FIG. 9 is a schematic block diagram showing components of a radar system according to yet another embodiment of the invention.
Figure 10:
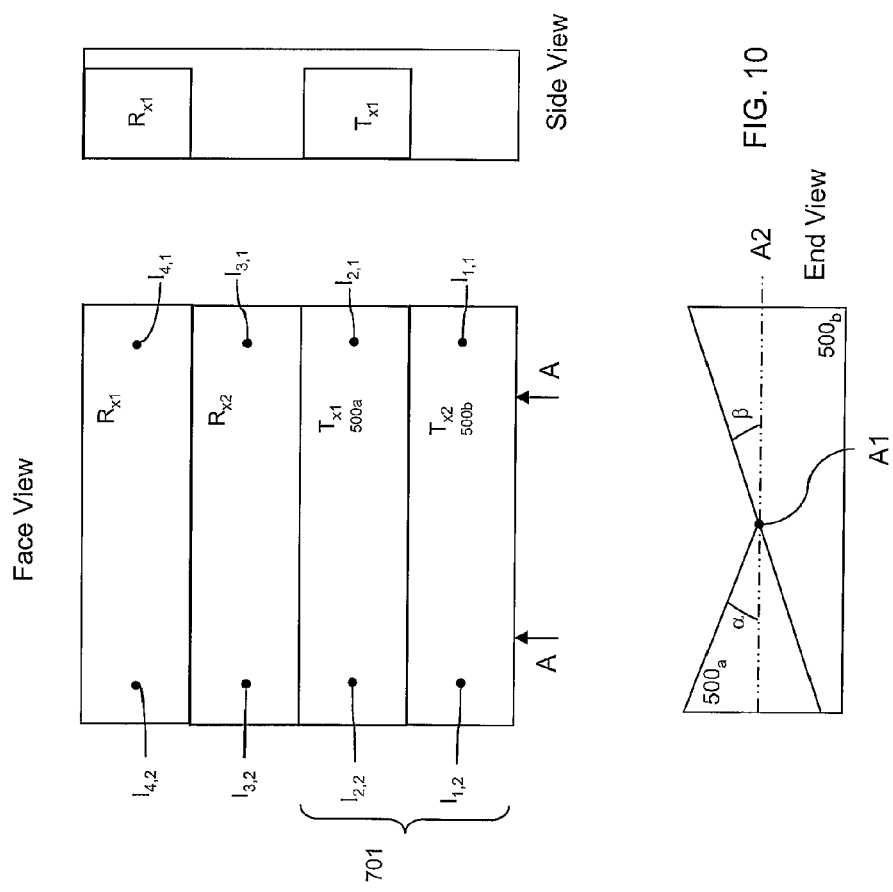
FIG. 10 is a schematic engineering drawing showing an antenna structure comprising the antenna arrays of FIG. 5a or 5b for use in any of the radar systems shown in FIGS. 1, 6 or 9.
Figure 11:
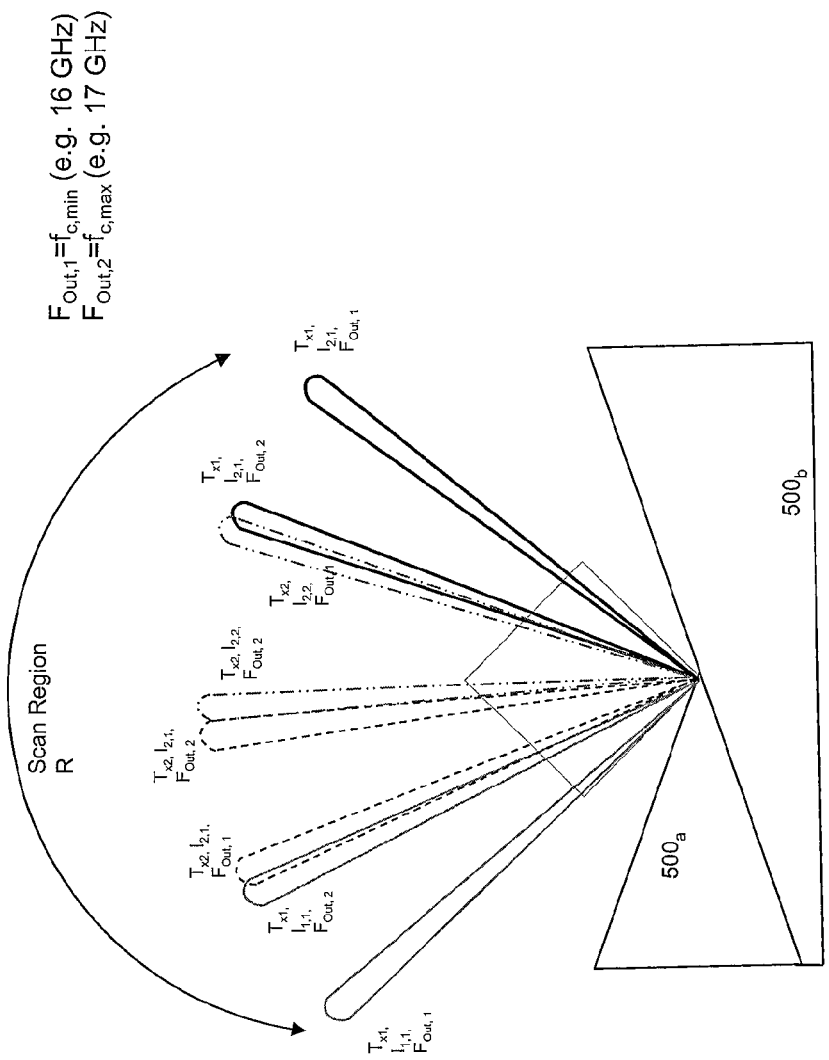
FIG. 11 is a schematic diagram showing radiation emitted from the antenna structure of FIG. 10.

The arrangements shown in FIGS. 5a, 6, 7, 8a and 8b relate to an arrangement in which the antenna arrays 500a, 500b comprise a single feed $I_1$, $I_2$ at one end of respective antenna arrays. However, and referring to FIGS. 5b and 10, each antenna array could comprise an additional feed at its other end ($I_{1,2}$, $I_{2,2}$). Each antenna 22a, 22b can then be considered to be capable of emitting radiation in two directions for a given frequency $f_{OUT}$, since the transceive-behaviour of the antenna array 500a is dependent on the direction from which energy is fed into the antenna. In FIG. 9, this is indicated by the presence of two antennas for each of antenna parts 22a and 22b. Turning to FIG. 11, it can be seen that by feeding energy to two input feed points for each antenna array, the region R within which radiation can be transceived is effectively doubled.

It will be appreciated from the foregoing that the frequency $f_{OUT}$ of signals output from the signal generator 16 is controlled by the controller 12. In addition to controlling the duration and rate of the ramp as described above, the controller 12 is arranged to select a different value for carrier frequency after the ramp pattern has been repeated a specified number of times for a given carrier frequency (examples of 256 and 512 were given above). In one arrangement the values for the carrier frequency can be selected from a look-up table accessible to the controller 12 (e.g. stored in local memory or on the computer 14), this look-up table being particular to a given antenna array 500a, 500b.

Figure 12:
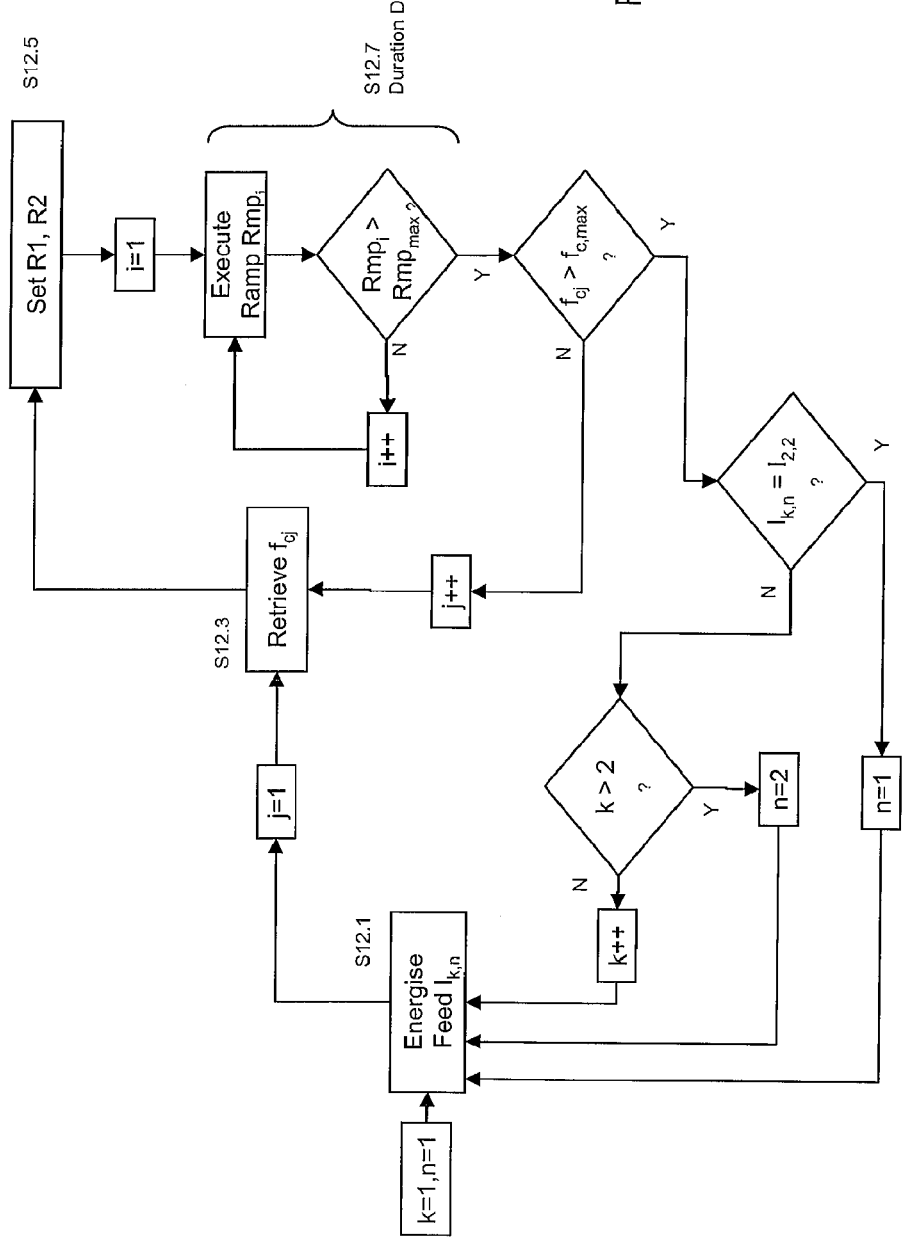
FIG. 12 is a schematic flow diagram showing steps performed by the controller shown in FIG. 1 during scanning of the radar system of FIG. 1.

Operation of the radar system 1 described above will now be described with reference to FIG. 12, which is a schematic flow diagram showing steps carried out by the controller 12. At step S12.1 the controller 12 energises one of the input feeds $I_{k,n}$ of the antenna structure 701, e.g. by appropriate configuration of the switch 18; at S12.3 the controller 12 retrieves the value of the first carrier frequency $f_{c1}$ (e.g. from the look-up table mentioned above), and at step S12.5 the controller 12 sets the values of R1 and R2 accordingly (to set the carrier frequency) and causes the third circuit portion 230 to generate the ramp pattern a predetermined number of times $Rmp_{max}$ (S12.7), to repeatedly modulate the carrier frequency. Having reached $Rmp_{max}$, the controller retrieves the value of the next carrier frequency $f_{c2}$ and sets the values R1, R2. Preferably the overall duration of step S12.7—in other words the duration of any given set of repetitions of the linear ramp $301_i$ pattern—is the same for all values of the carrier frequency, $f_{cj}$. These steps are repeated, as shown in FIG. 12, for each feed point $I_{1,1}$ $I_{2,1}$ $I_{2,2}$ $I_{2,1}$ to the antenna structure 701, thereby causing the antenna structure 701 to progressively scan over the angular extent R.

The description has thus far focussed on the generation and transmission of signals from the radar system 1; referring to FIGS. 1, 6, 7, 9 and 10, aspects of with receiving and processing of signals will now be described. As can be seen from these Figures the radar system 1 preferably also includes a separate antenna 32 embodied as structure 703 for receiving radiation, which corresponds to the transmitting antenna structure 701 described above. Referring to FIG. 6 or 9, the signals received by antenna structure 703 are input to mixer 34, together with the output $f_{OUT}$ from the RF frequency generator 16, and, in accordance with standard homodyne operation, the output from the mixer 34 is fed through an ADC 36 to produce a digitised Intermediate Frequency ($F_{if}$) signal as input to the signal processor 38. Energising of the receiving antenna structure 703 is performed under control of the controller 12, via switch 18', and, as for the transmitting antenna structure 703, this occurs during the linear ramp period only $301_i$.

The signal processor 38 is conveniently embodied as a programmable logic controller (PLC) and a plurality of software components, which run locally on the PLC 38 in response to signals received from a conventional PC computer 14 and which are written using the proprietary programming language associated with the PLC 38.

Figure 13:
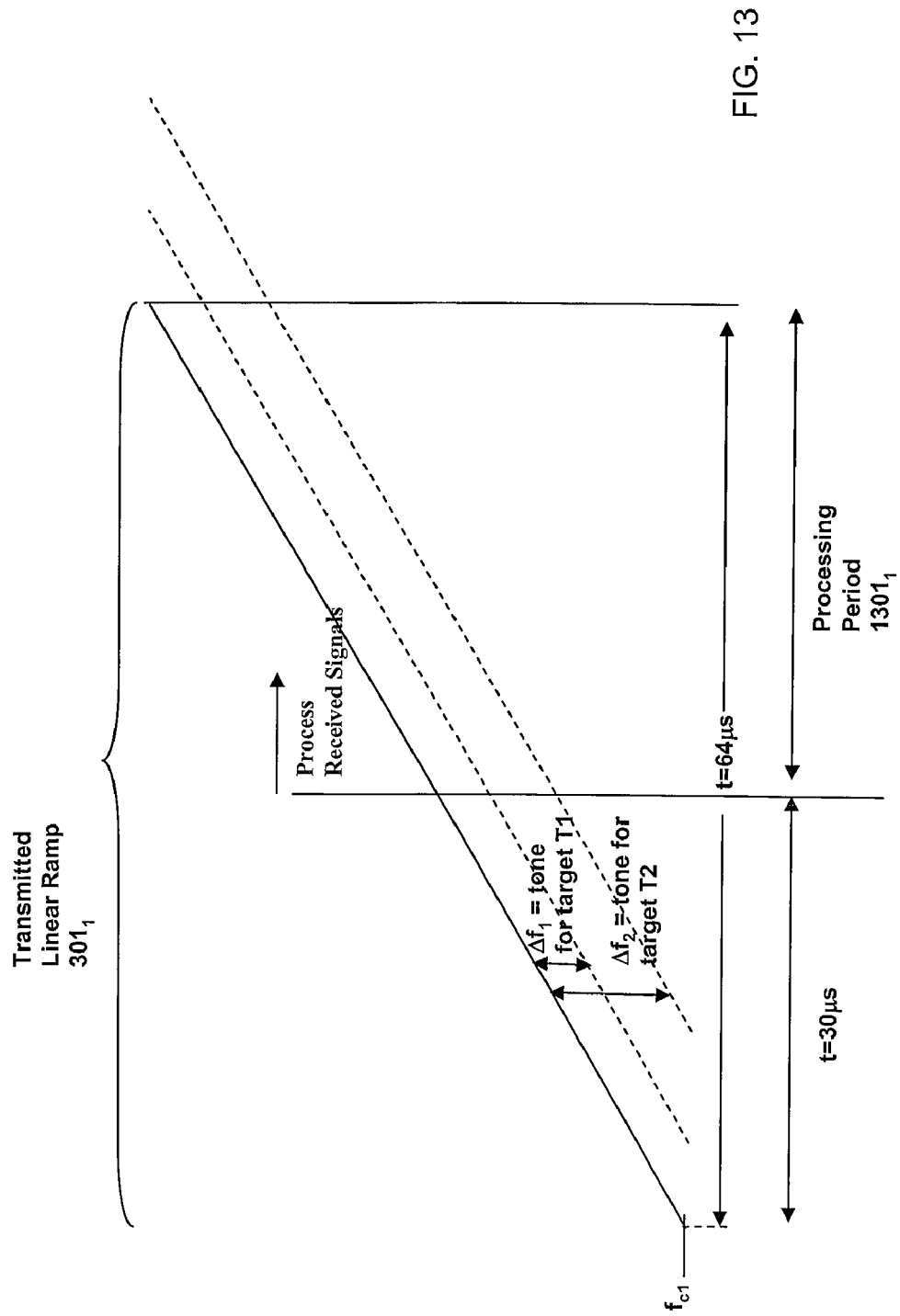
FIG. 13 is a schematic diagram showing processing of signals in relation to a transmitted modulation pattern.

As described above, the radar system 1 operates according to homodyne principles, which means that the Intermediate Frequency $F_{if}$ is equal to differences between the received signal frequency and the transmitted signal frequency. In embodiments of the invention, as will be appreciated from the foregoing and FIGS. 2 and 3 in particular, the output of the radar system 1 is a sequence of frequency sweeps $301_i$. It is a well known principle of radar that targets located in the path of a given transmitted beam will reflect the transmitted signals; since the transmitted signal in embodiments of the present invention comprises a linear frequency sweep $301_i$, the reflected signals also comprise a linear frequency sweep. Targets that are stationary will generate reflected signals that are identical to the transmitted signals (albeit somewhat attenuated), but separated therefrom at a constant frequency difference referred to herein as a tone. Referring to FIG. 13, it will be appreciated from the Figure that different targets T1, T2—located at different distances from the radar system 1—reflect the transmitted sweep $301_i$ at different delays in relation to the time of transmission, and that therefore targets T1, T2 at these different locations will be associated with different tones $\Delta f_1, \Delta f_2$.

In view of the fact that the signals output from the mixer 34 contain tones, the signal processor 38 is arranged to delay the processing of signals until the ramp 301 has travelled to the extents of the detection region and back. Thus for example, if the detection region extended to 4.5 km from the radar system 1, the signal processor 38 would start processing signals output from the mixer 34 at:

$$\frac{4500 \times 2}{3 \times 10^8} = 30 \text{ μs}$$

from the start of transmission of a given ramp $301_i$.

Considering, for the sake of clarity, one processing period $1301_1$, the signal processor 38 essentially calculates the Doppler frequency of targets within range of the transmitted beam—and which reflect the transmitted beam. This is achieved by sampling the received tones $\Delta f_1, \Delta f_2 \ldots \Delta f_m$ at a predetermined sampling rate. The sampling rate is selected so as to as ensure that phase shifts of the transmitted signal, which are induced by moving targets, can be captured. The skilled person will appreciate that this is dependent on the ramp rate, since the Doppler frequency is dependent on the frequency of the transmitted signal:

Doppler Frequency=$2vf_c/c$ [Equation 1]

Thus, the output of the ADC 36 falling within the processing period $1301_1$ will be processed a predetermined number of times (corresponding to the sampling rate) by the signal processor 38. Each sample will contain zero, one or a plurality of tones, each relating to signals reflected from targets.

As will be appreciated from the foregoing, the linear ramp $301_i$ is transmitted a plurality of times for each carrier frequency. Accordingly the signal processor 38 processes data received during a corresponding plurality of processing periods $1301_i$, and generates, by means of a Range FFT, a set of return samples, individual members of which are assigned to a respective set of range gates for each processing period $1301_i$. Thus the output of the Range FFT, for a given Processing period $1301_1$, is frequency information distributed over so-called range gates. As is well known in the art, range gates represent successive distances from the radar system 1, such that if return samples fall within a given range gate, this indicates the presence of a target located at a distance equal to the range gate within which the return sample falls.

Having transformed the received signals into range gates the signal processor 38 is arranged to take the FFT of the return samples assigned to each given range gate. In the current example it will be appreciated that each set of range gates corresponds to transmission of a linear ramp $301_i$ (for a given carrier frequency), and that the sampling rate in relation to range gates—the rate at which data falling within a given range gate are measured—is the frequency at which the pattern of transmission of linear ramps $301_i$ is repeated (commonly referred to as the Pulse Repetition Frequency (PRF)). In the example given above, and with reference to FIG. 3, this is nominally 8 KHz. Accordingly, for each carrier frequency, the signal processor 38 effectively generates an array of data, each row in the array corresponding to a given processing period $1301_i$, and each column in the array corresponding to a given range gate.

The FFT output comprises amplitudes and phases of various components of signal energy which fall on frequencies spaced linearly at the inverse of the duration of a complete signal sample set (in embodiments of the invention, the signal set comprises tones, not absolute frequency values). In the current example, therefore, and assuming the signal sample set for a given carrier frequency to comprise the 512 linear ramps $301_1 \ldots 301_{512}$ transmitted at a rate of 8 KHz, there are 512 FFT output bins spaced at a Doppler frequency of 8000/512=15.625 Hz; for a carrier frequency of 15 GHz, this is equivalent to 0.15625 m/s. Thus each FFT output bin represents a different velocity; stationary targets will appear in bin 0, while moving targets will appear in a bin dependent on their velocity (a target travelling at 10 m/s will appear in bin 64).

As is known in the art, the signal processor 38 can be arranged to store each set of range gate samples in a "row" of a conceptually rectangularly-organised memory, referred to as a corner store, each row corresponding to range gates falling within a given processing periods $130_i$ and thus to a particular linear ramp $301_i$. Once all 512 linear ramps $301_1 \ldots 301_{512}$ have been transmitted, each column—i.e. each range gate—is read out and input to a FFT for processing thereby in the manner described above.

From Equation 1, it will be appreciated that the Doppler frequency is directly proportional to the carrier frequency $f_c$. Therefore when the carrier frequency varies—as is the case with frequency scanning antennas—the variation in carrier frequency will modify the derived Doppler frequencies so as to effectively scale the magnitude of the frequencies. For example, a radar system that operates between 15.5 GHz to 17.5 GHz can generate Doppler frequencies, for a given target, which vary by ±6%. This equates to a system-generated shift in Doppler frequency of more than 2 semitones, and a variation in ambiguous Doppler velocity from 70 mph to 79 mph, which can complicate the task of removing velocity ambiguity from targets moving at these speeds and above. Referring back to FIG. 11 it will be appreciated that in certain configurations of the radar system 1 the carrier frequency can jump from the maximum carrier frequency to the minimum carrier frequency, causing the signal processor 38 to output a change in tone of more than 2 semitones.

Accordingly the controller 12 is arranged to modify the sweep repeat period 307 (or sweep repetition frequency) such that the sweep repetition frequency is proportional to the carrier frequency, thereby effectively removing this systematic aberration. Turning back to FIG. 12, this means that step S12.5 performed by the controller 12 in relation to carrier frequency $f_{cj}$ retrieved at step S12.3 is accompanied by calculation of a sweep period 307 for the particular value of this carrier frequency $f_{cj}$. In preferred embodiments of the invention the linear sweep period 301 remains unchanged (so that the effect of this adjustment does not affect the signal processor 38), and the controller 12 adjusts the duration of the flyback and/or dwell periods 303, 305; most preferably the dwell period 305 is modified. Of course all of the repetitions of the sweep repeat period $307_1, f_{cj} \ldots 307_{512}, f_{cj}$ are identical for a given carrier frequency $f_{cj}$ (step S12.7). In one embodiment the controller 12 has access to a look-up table, which lists sweep repeat periods $307_j$ for discrete carrier frequencies $f_{cj}$. Conveniently such data could be stored in the look-up table that is accessed by the controller at step S12.3, when identifying a next carrier frequency $f_{cj}$.

As described above in relation to FIG. 12, the overall duration D of step S12.7 is preferably maintained constant. When, as is the case with embodiments of the invention, the sweep repeat period $307_j$ varies in accordance with carrier frequency $f_{cj}$ the duration of 512 repetitions applied in respect of each different carrier frequency varies; thus, of itself, the period associated with 512 repetitions would not be of duration D for all carrier frequencies. In order to ensure that the duration is nevertheless constant, the controller 12 is configured to wait for a period equal to the time difference between the end of 512 repetitions and duration D before moving onto the next instance of steps S12.3, S12.5 and S12.7 (i.e. for a different carrier frequency). In the present example the value of D is preferably set to the sum of 512 sweep repeat periods 307 corresponding to the duration of the longest sweep repeat period (and thus that associated with the lowest carrier frequency $f_{cj}$).

This feature of the controller 12 is advantageous for configurations in which the linear ramp period 301 is constant (in FIG. 3 it is shown as 64 µs), incurring a fixed transmitter power dissipation: maintaining duration D for the overall duration of step S12.7 means that the average transmitter dissipation is constant and independent of variations to the sweep repeat period 307 (PRF). As a result the temperature of the transmitter $T_x$ is maintained at a constant level, which, in turn, minimises the variations in parameters that are temperature dependent.

Preferably the Doppler frequencies are scaled and output as tones within the audible range and at a fixed audio sample rate. Playing back the tones at a fixed rate is a convenient approach in view of the fact that the Doppler frequencies have been normalised in relation to the variation in carrier frequency.

As an alternative to selecting sweep repeat periods $307_j$ as a function of carrier frequency $f_{cj}$, the sweep repeat period $307_j$ could be varied incrementally, for example linearly, based on the approximation $1+\alpha \approx 1/(1-\alpha)$ for $\alpha \ll 1$. For the example frequency range of 15.5 GHz-17.5 GHz, the sweep repeat period 307 for a carrier frequency of 15.5 GHz could be 140.65 µs, and period 307 for a carrier frequency of 17.5 GHz could be 125 µs, while the sweep repeat period 307 for carrier frequencies between the extents of this range can be selected so as to vary linearly between 125 µs and 140.65 µs. As for the first alternative—where the sweep repeat period 307 is varied discretely as the carrier frequency varies—the linear ramp 301 and thus the processing periods 1301 remain unchanged for all values of the sweep repeat period 307. The net change in Doppler frequency is then reduced to ±0.2% and the ambiguous Doppler velocity varies from 78.7 mph to 79.0 mph.

As described above, a radar system according to embodiments of the invention can conveniently be used for transceiving radio frequency energy and processing the same so as to output an audible representation of Doppler frequencies and thus identifying moving targets. The signal processor 38 is arranged to transmit data indicative of the Doppler frequencies to the computer 14, which comprises a suite of software components 39 arranged to convert the Doppler frequencies to audible signals and to playback the same. As described above, the Doppler Frequencies are normalised by processing the received signals at a variable rate, the rate being selected in dependence on the carrier frequency of the transceived signal, while the rate at which the audio is played back is substantially constant. Preferably the post processing software components 39 are arranged to ensure smooth transition between respective audio bursts by controlling the playback rate in relation to the rate at which, for a given range gate, data have been processed by the signal processor 38 (i.e. the frequency at which the pattern of transmission of linear ramps $301_i$ is repeated). If the PRF is varied between 7 KHz and 8 KHz and the audio playback rate is 8.5 KHz, then in the absence of suitable phased-audio control, there will be gaps in the audio output, which presents an interruption to any audible analysis of the Doppler data; one way of mitigating this is to recycle Doppler data during periods that would otherwise be silent, until such time as further Doppler data are made available from the signal processor 38. In order to ensure a smooth transition between respective sets of Doppler data, the computer 14 would be arranged to fade-out previous, and fade-in and current, sets of Doppler data. As an alternative, the audio playback rate could be set at a value lower than the PRF (e.g. for the current example, 6.9 KHz) so that respective sets of Doppler data overlap; the periods of overlap can be managed using appropriately selected fade-in and fade-out functions.

In arrangements where the duration of sets of repetitions of the linear ramp period $301_i$ is constant (duration D), any set of Doppler data (corresponding to a given carrier frequency $f_{cj}$) will arrive at the signal processor 38 a constant rate, which means that the software components 39 can be configured to apply the same conditions in relation to overlaps and/or gaps in the Doppler data (since the amount of overlap or gap can always be calculated from duration D). An advantage of this arrangement is that it simplifies the logic associated with the post-processing software components 39 and enables more constant audio output over the varying PRF.

A particular feature of a radar system according to embodiments of the invention is that the software components 39 are arranged to transmit data output from the signal processor 38 to a remote processing system, for tracking and monitoring of targets. Most preferably the software components 39 are arranged to transmit data output from the signal processor 38 each time the carrier frequency—and thus region being scanned—changes. This means that the computer 14 acts primarily as a conduit for data, while the data intensive processes of correlating targets between successive scans, rendering of targets upon a display and prediction of target behaviour can be performed by a separate processing system. In a preferred arrangement the data are transmitted wirelessly, but it will be appreciated that any suitable transmission means could be used.

Additional Details and Alternatives

Whilst in the foregoing the linear ramp 301 is independent of variations in the sweep repeat period, the controller 12 could alternatively modify the duration and/or slope of the linear ramp. Whilst this is not a preferred method, because operation of the signal processor 38 (in particular in relation to the processing periods 1301) would have to be modified, modifying the slope is a convenient method when more than one radar system is being utilised in a given region, since the difference in slopes of the linear ramp can be used to distinguish between output from respective radar systems.

Figure 14:
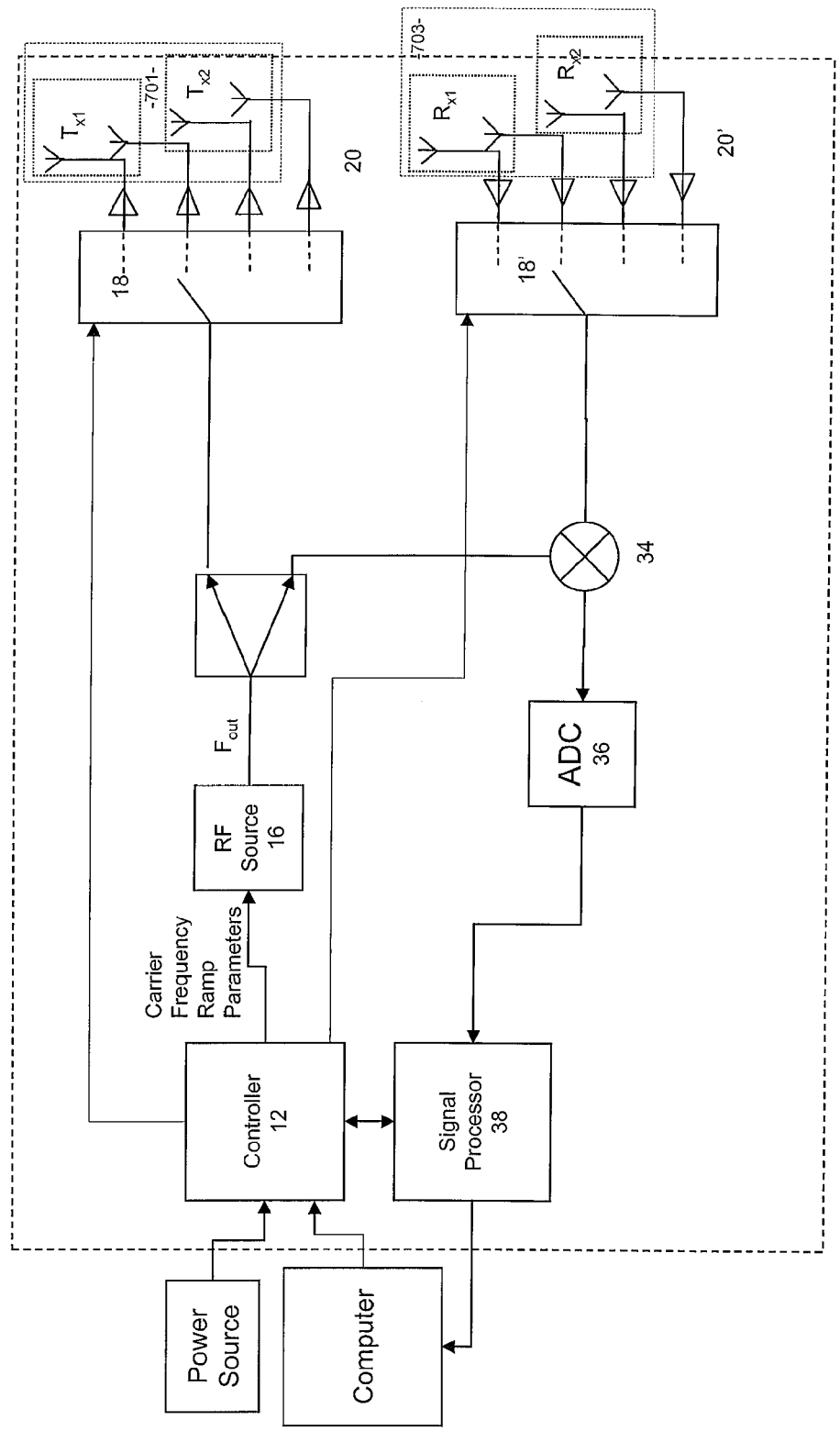
FIG. 14 is a schematic block diagram showing components of a radar system according to yet another embodiment of the invention.

FIG. 14 shows an alternative configuration of the radar system 1 comprising antenna structures according to embodiments of the invention, in which the single amplifiers 20, 20' are replaced by individual amplifiers, each being associated with a respective antenna.

Figure 15:
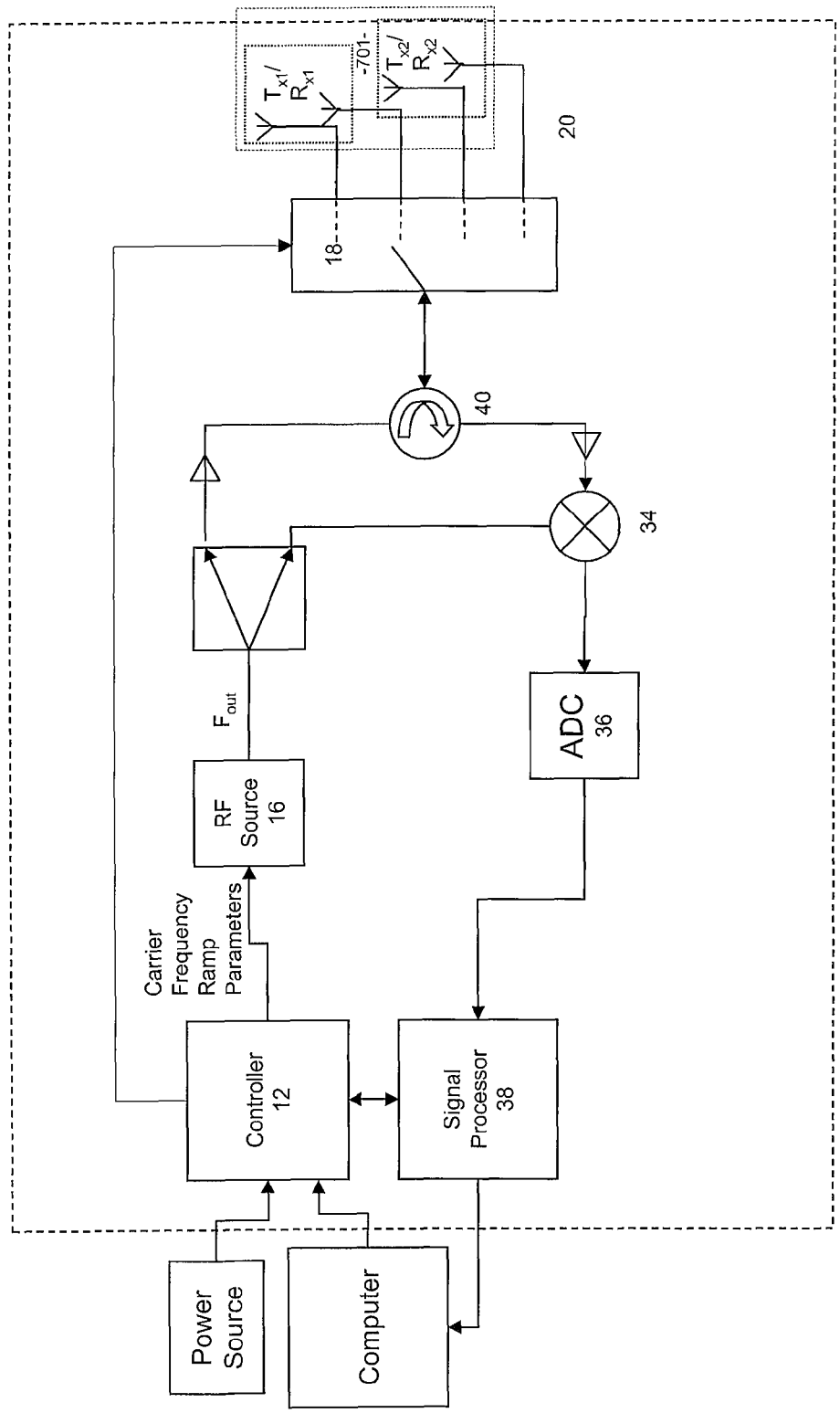
FIG. 15 is a schematic block diagram showing components of a radar system according to a yet different embodiment of the invention.

In the above passages the radar system 1 is assumed to comprise a separate transmit and receive antenna structure 701, 703. However, and turning to FIG. 15, the radar system 1 could alternatively comprise a single antenna structure 701 and a circulator 40, which, as is known in the art effectively combines signals that are transmitted and received from the antenna structure 701. As an alternative to the circulator 40, the radar system 1 could include a switch or an alternative antenna utilising a turnstile junction or orthomode junction (not shown).

Figure 16:
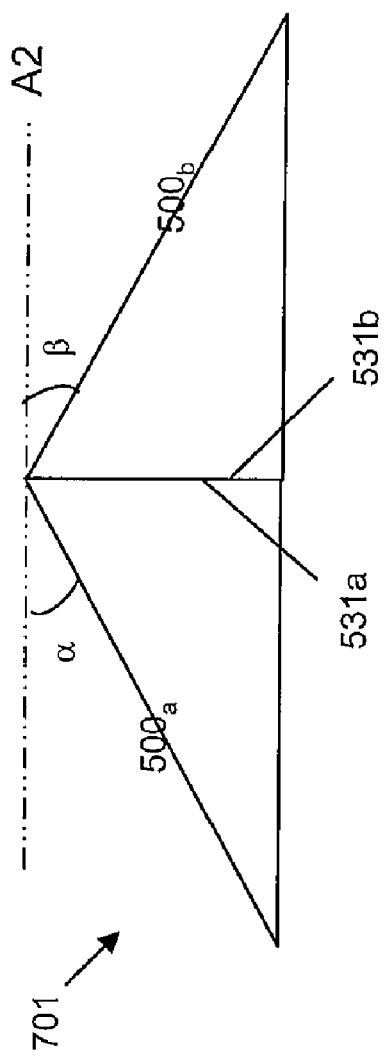
FIG. 16 is a schematic engineering drawing showing an alternative antenna structure comprising the antenna arrays of FIG. 5a or 5b for use in either of the radar systems shown in FIG. 1 or 6.

FIG. 16 shows an alternative configuration of the antenna arrays 500a, 500b within an antenna structure 701, in which each the antenna array 500a, 500b is located on a respective support structure, an outer edge 531*a* of one support structure abutting a corresponding outer edge 531*b* of another support structure so as to form an antenna structure having a generally isosceles shape; since the supports of respective antenna arrays abut one another the radar system can be fabricated such that receiving antenna structure 701 abuts transmitting antenna structure 703, thereby generating a physically smaller radar system, in terms of depth occupied by the antenna structure, compared to that shown in FIG. 7. It will be appreciated that other configurations are possible, involving two, three or several such antenna arrays mounted on suitable support structures.

Whilst in embodiments of the invention the radar system 1 preferably uses antenna structure 701 described above, which is based on travelling wave antenna technology, the radar system 1 could alternatively use a waveguide in the form of a serpentine antenna or similar as the frequency scanning antenna. A suitable antenna is described in U.S. Pat. No. 4,868,574.

Whilst the above embodiments describe use of a frequency scanning antenna for beam steering, it will be appreciated that the configurations and methods described above could be applied for the purposes of avoidance detection, and/or in the presence of other radar systems, and/or to counteract frequency jamming equipment (e.g. by hopping between operating frequencies in order to avoid detection of, interference with, or jamming of, the radar system).

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A frequency modulated continuous wave (FMCW) radar system comprising a frequency generator and a homodyne receiver arranged to process signals received from a target so as to identify a Doppler frequency associated with the target,
   wherein the frequency generator is arranged to generate a plurality of sets of signals, the signals within a given set having the same carrier frequency and each set having a different carrier frequency, the frequency generator comprising a digital synthesiser arranged to frequency modulate a continuous wave signal of a given carrier frequency by a sequence of modulation patterns whereby to generate a said set of signals, said individual ones of said patterns being repeated within a set,
   wherein the receiver is arranged to process signals indicative of radiation reflected from a target so as to derive frequency data therefrom, said derived frequency data representing a tone corresponding to said target.

2. A FMCW radar system according to claim 1, wherein the receiver comprises a signal processor arranged to perform a first transform on the received signals to derive said frequency data representing said tone, said tone being related to a range of the target, and a second transform on data output from the first transform to derive a Doppler frequency related to a velocity of the target.

3. A FMCW radar system according to claim 1, the receiver comprising signal processing means arranged to process said tone so as derive data indicative of movement of said target, and to transmit said derived movement data to a display means, said display means being located remote from said scanning radar system.

4. A FMCW radar system according to claim 3, wherein the radar system is arranged to communicate wirelessly with said display means.

5. A FMCW radar system according to claim 1, the radar system being arranged to cooperate with a portable power source.

6. A FMCW radar system according to claim 5, wherein the portable power source comprises a battery pack or a solar panel.

7. A FMCW radar system according to claim 1 wherein said sequence of modulation patterns is generated by direct digital synthesis.

8. A FMCW radar system according to claim 1, wherein the frequency generator comprises a first circuit portion and a second circuit portion,
   the first circuit portion comprising a variable frequency oscillator arranged to output signals at an output frequency in dependence on control signals input thereto and tuning means arranged to generate said control signals on the basis of signals received from the second circuit portion for use in modifying operation of the variable frequency oscillator,
   the second circuit portion being arranged to receive said output signals and to derive therefrom signals to be input to said tuning means, the second circuit portion comprising a frequency divider arranged to generate signals of a divided frequency, lower than said output frequency,
   wherein the second circuit portion comprises means arranged to derive reduced frequency signals from said output signal, said reduced frequency signals being of a frequency which is lower than said output frequency and higher than said divided frequency.

9. A FMCW radar system according to claim 8, further comprising a fixed frequency oscillator, wherein the second circuit portion comprises a static frequency multiplier component arranged to derive increased frequency signals from the fixed frequency oscillator.

10. A FMCW radar system according to claim 9, wherein the means arranged to derive reduced frequency signals comprises a mixer component arranged to receive signals output from the variable frequency oscillator and signals output from the static frequency multiplier component so as to derive said reduced frequency signals.

11. A FMCW radar system according to claim 9, wherein the tuning means comprises a frequency comparator component, said fixed frequency oscillator being arranged to output signals to the first circuit portion via a further frequency divider, and said frequency comparator being arranged to generate said control signals on the basis of signals received from said further frequency divider and said divided frequency.

12. A FMCW radar system according to claim 8, wherein the frequency generator further comprises:
   combining means arranged to combine said sequence of modulation patterns with said signals output from the first circuit portion so as to frequency modulate said signals output from the first circuit portion.

13. A FMCW radar system according to claim 1, further comprising a radar controller for use in controlling modulation of the continuous wave signal, wherein the radar controller is in operative association with the digital synthesizer so as to modify a given sequence of modulation patterns in dependence on the carrier frequency of the signal being modulated.

14. A FMCW radar system according to claim 13, wherein the radar controller is arranged to modify the duration of individual modulation patterns of the sequence, thereby modifying the modulation pattern.

15. A FMCW radar system according to claim 13, wherein each modulation pattern of the sequence comprises a ramp period and an intervening period, and the radar controller is arranged to modify the duration of the intervening periods of respective modulation patterns in the sequence, thereby modifying the modulation pattern.

16. A FMCW radar system according to claim 15, wherein each modulation pattern of the sequence comprises a linear ramp period and a dwell period, and the radar controller is arranged to modify the duration of dwell periods of respective modulation patterns in the sequence, thereby modifying the modulation pattern.

17. A FMCW radar system according to claim 15, wherein each modulation pattern of the sequence comprises a linear ramp period and a descent period, and the radar controller is arranged to modify the duration of descent periods of respective modulation patterns in the sequence, thereby modifying the modulation pattern.

18. A FMCW radar system according to claim 13, wherein each modulation pattern of the sequence comprises a linear ramp period.

* * * * *